(12) United States Patent
Kwon

(10) Patent No.: US 12,196,290 B2
(45) Date of Patent: Jan. 14, 2025

(54) SPEED REDUCER HAVING SELF-LOCKING FUNCTION WITHOUT RING GEAR, AND SELF-LOCKING METHOD OF SPEED REDUCER

(71) Applicant: Oh Wan Kwon, Hwaseong-si (KR)

(72) Inventor: Oh Wan Kwon, Hwaseong-si (KR)

( * ) Notice: Subject to any disclaimer, the term of this patent is extended or adjusted under 35 U.S.C. 154(b) by 0 days.

(21) Appl. No.: 18/471,045

(22) Filed: Sep. 20, 2023

(65) Prior Publication Data

US 2024/0011541 A1 Jan. 11, 2024

Related U.S. Application Data

(63) Continuation of application No. PCT/KR2022/007159, filed on May 19, 2022.

(30) Foreign Application Priority Data

May 20, 2021 (KR) .................. 10-2021-0064515

(51) Int. Cl.
*F16H 1/36* (2006.01)
*F16H 57/08* (2006.01)
*F16H 1/00* (2006.01)
*F16H 1/28* (2006.01)

(52) U.S. Cl.
CPC ............. *F16H 1/36* (2013.01); *F16H 57/082* (2013.01); *F16H 1/003* (2013.01); *F16H 2001/2881* (2013.01)

(58) Field of Classification Search
CPC .... F16H 1/003; F16H 1/36; F16H 2001/2881; B66D 1/22

USPC ........................................... 475/339
See application file for complete search history.

(56) References Cited

U.S. PATENT DOCUMENTS

| 1,632,571 A * | 6/1927 | Watson ............... B66D 1/22 254/342 |
| 8,591,367 B2 * | 11/2013 | Kochan ............... F16H 1/003 475/343 |
| 10,344,857 B2 * | 7/2019 | Wang ................. F16H 1/32 |
| 10,794,460 B2 | 10/2020 | Nishiji et al. | |
| 2010/0035717 A1 * | 2/2010 | Tae .................... B66D 3/12 475/343 |

FOREIGN PATENT DOCUMENTS

| JP | 2010-060095 A | 3/2010 |
| JP | 6004876 B2 | 10/2016 |
| JP | 2018-506003 A | 3/2018 |

(Continued)

*Primary Examiner* — Sherry L Estremsky
(74) *Attorney, Agent, or Firm* — NKL Law; Jae Youn Kim

(57) ABSTRACT

Proposed are a speed reducer having a self-locking function without a ring gear, and a self-locking method of the speed reducer. Particularly, the speed reducer is characterized in that first, second and third planetary gears are supported at different locations on one side of a carrier, which is an input side, so as to be able to rotate and revolve and be disposed in n sets, and when fixing any one of a first sun gear and a second sun gear and switching one remaining sun gear into an input side and rotating the same, speed is not increased due to a self-locking function and a speed increase ratio is zero (a stationary state in which the sun gear used as the input side cannot rotate), thereby resulting in self-locking which is a non-operating state.

4 Claims, 17 Drawing Sheets

(56) References Cited

FOREIGN PATENT DOCUMENTS

| | | | |
|---|---|---|---|
| JP | 2020-008062 | A | 1/2020 |
| KR | 200182236 | Y1 * | 5/2000 |
| KR | 10-0505017 | B1 | 8/2005 |
| KR | 10-1270459 | B1 | 6/2013 |
| KR | 10-1491251 | B1 | 2/2015 |

* cited by examiner

SPEED REDUCER HAVING SELF-LOCKING FUNCTION WITHOUT RING GEAR, AND SELF-LOCKING METHOD OF SPEED REDUCER

TECHNICAL FIELD

The present disclosure relates to a speed reducer having a self-locking function without a ring gear, and a self-locking method of the speed reducer. Particularly, the present disclosure relates to a speed reducer having a self-locking function without a ring gear, and a self-locking method of the speed reducer in which first, second, and third planetary gears are supported at different locations on one side of a carrier, which is an input side, so as to be able to rotate and revolve and be disposed in n sets, and when fixing any one of a first sun gear and a second sun gear and changing one remaining sun gear into an input side and rotating the same, speed is not increased due to a self-locking function and a speed increase ratio is zero (a stationary state in which the sun gear used as the input side cannot rotate), thereby resulting in a non-operating state.

BACKGROUND ART

Generally, an engine or motor, which is a driving source, rotates at high speed for its efficiency and is used by receiving power at an appropriate RPM by reducing the number of rotation at a predetermined rate according to the device. A speed reducer used in this case generally combines multiple gears to achieve speed reduction due to difference in the number of teeth thereof. As such a speed reducer, a planetary gear device is applied. A planetary gear reducer includes a sun gear installed on a central shaft thereof, a plurality of planetary gears engaged with this sun gear to revolve around the sun gear and rotate are arranged, with the planetary gears being rotated by being supported by a carrier, and a ring gear engaged with the outer side of the planetary gears.

In addition, since the structure of the speed reducer requires three or more stages of connection between gears to achieve large deceleration, the volume and weight of the speed reducer increase due to a large number of gears having large and small diameters and multiple shafts, and as the difference between the diameters increases, greater reduction can be achieved in a lower stage, and accordingly, it is preferable to increase diameter difference between the gears.

However, since a ring gear is provided in a typical planetary gear reducer, there is a problem in that it is difficult to manufacture the normal planetary gear reducer and manufacturing costs thereof increase. In addition, when high-ratio deceleration, low-ratio deceleration, or speed increase is required, gears are required to be configured in multiple stages, so manufacturing costs and volume increase.

In addition, since a self-locking function is not available, a situation in which reversal prevention is required or heavy objects have to be lifted to stop is controlled by using a separate brake device, and accordingly the use of the planetary gear reducer is inconvenient and the ease of control thereof reduces.

Meanwhile, when arranging planetary gears around a sun gear, due to constraints related to the number of teeth, it is difficult to reduce manufacturing costs by reducing the number of the planetary gears or to increase strength by increasing the number of the planetary gears.

Examples of such techniques are disclosed in Patent Documents 1 to 3 below.

For example, Patent Document 1 described below discloses a speed reducer including a housing having an internal gear and a planetary gear and a sun gear sequentially geared to each other in the direction of the shaft center thereof, a drive shaft introduced into the housing and coupled to the sun gear, an output shaft connected to a driving gear disposed in parallel to the internal gear and engaged with the planetary gear, with the number of teeth of the driving gear being different from the number of teeth of the internal gear, wherein even when a load is applied to the drive shaft, the tooth space of the internal gear and the driving gear is engaged with the teeth of the planetary gear, so due to the internal gear fixed to the housing, the driving gear is self-locked.

In addition, Patent Document 2 described below discloses a speed reducer including a sun gear installed on a rotational shaft of a motor, a plurality of planetary gears disposed around the sun gear to be engaged with the sun gear, a carrier rotating by being connected to the shafts of the planetary gears, an internal gear unit having a fixed internal gear fixed on the outer sides of the planetary gears by being spaced apart by a predetermined distance therefrom and a rotary internal gear rotating by being engaged with the outer sides of the planetary gears and the carrier, and a means provided on the fixed internal gear and moving the rotary internal gear forward and backward in the longitudinal direction of the rotational shaft according to the supply and cut-off of power.

Meanwhile, Patent Document 3 described below discloses a power transmission apparatus for a hybrid vehicle which realizes two or more engine fixed gear stages that can distribute engine output to driving wheels by using a Ravigneaux gear train in which a single pinion planetary gear is integrated with a double pinion planetary gear including a carrier in which two pinion gears are combined, and two or more clutches so that fuel efficiency can be improved.

In the technology disclosed in Patent Document 1 as described above, there is a problem that the speed reducer is required to be configured in multiple stages when high-ratio deceleration, low-ratio deceleration, or speed increase is required, and the number of teeth of the gears is restricted.

In addition, in the technology disclosed in Patent Document 2 as described above, there is a problem that although a response during braking can be improved by amplifying and transmitting the rotational force of the motor, the number of teeth of the gears is limited as in Patent Document 1.

Meanwhile, in the technology disclosed in Patent Document 3 as described above, there is a problem that although the Ravigneaux gear train, in which the single pinion planetary gear is integrated with the double pinion planetary gear, and the two or more clutches are used, high ratio deceleration cannot be executed.

That is, as described above, the methods of simple planetary gear, double planetary gear, and Ravigneaux planetary gear used in the conventional technology had the problems that high ratio reduction was not achieved, a reduction ratio that could be obtained in one layer was about 1/11 at most, and when the high ratio reduction was required, a two-layer (double) or more coupling method was required to be used. In addition, there was a manufacturing restriction that the number of teeth of the ring gear and the planetary gear had to be specified and arranged as a multiple of the number of planetary gear sets.

DISCLOSURE

Technical Problem

As described above, the present disclosure is intended to propose a speed reducer that can realize various gear speed ratios from high-ratio deceleration to low-ratio deceleration and is composed of only external gears without a ring gear so that difficulty in manufacturing is eliminated and space is reduced, thereby reducing manufacturing costs, and enabling mass production due to ease of processing. In addition, the present disclosure is intended to propose a speed reducer having a self-locking function without a ring gear and a self-locking method of the speed reducer, in which a self-locking function prevents reversal, thereby enabling easy control and various uses.

Technical Solution

In order to accomplish the above objectives, a speed reducer according to the present disclosure includes:
- a carrier rotated as an input side, a first sun gear provided concentrically with the carrier, a first planetary gear engaged with the first sun gear, a second planetary gear engaged with the first planetary gear, a third planetary gear engaged with the second planetary gear, and a second sun gear concentric with the carrier, provided in parallel to the first sun gear, and engaged with the third planetary gear,
- wherein difference between the number of teeth of the first sun gear and the number of teeth of the second sun gear is at least one; the first, second, and third planetary gears are supported at different locations on one side of the carrier so as to be able to rotate and revolve and be disposed in n sets;
- the carrier is the input side; the first sun gear is a fixed side; the second sun gear is an output side; Z1 is defined as the number of teeth of the first sun gear; and Z2 is defined as the number of teeth of the second sun gear,
- wherein when Z1<Z2 and (Z2−Z1)<Z1 are satisfied, an output of the second sun gear is deceleration in the same direction;
- when Z1>Z2 and (Z1−Z2)<Z2 are satisfied, the output of the second sun gear is deceleration in a reverse direction;
- and when only one of the deceleration conditions is satisfied and the second sun gear is rotated by being changed to an input side, speed is not increased due to the self-locking function and a speed increase ratio is zero (a stationary state in which the sun gear used as the input side is not able to rotate).

The speed reducer according to another aspect of the present disclosure includes: the carrier rotated as an input side, the first sun gear provided concentrically with the carrier, the first planetary gear engaged with the first sun gear, the second planetary gear engaged with the first planetary gear, the third planetary gear engaged with the second planetary gear, and the second sun gear concentric with the carrier, provided in parallel to the first sun gear, and engaged with the third planetary gear, wherein difference between the number of teeth of the first sun gear and the number of teeth of the second sun gear is at least one; the first, second, and third planetary gears are supported at different locations on one side of the carrier so as to be able to rotate and revolve and be disposed in n sets; the carrier is the input side; the second sun gear is a fixed side; the first sun gear is an output side; Z1 is defined as the number of teeth of the first sun gear; and Z2 is defined as the number of teeth of the second sun gear,
- wherein when Z1>Z2 and (Z1−Z2)<Z2 are satisfied, the output of the first sun gear is deceleration in the same direction; when Z1<Z2 and (Z2−Z1)<Z1 are satisfied, the output of the first sun gear is deceleration in a reverse direction; and
- when only one of the deceleration conditions is satisfied and the first sun gear is rotated by being changed to an input side, speed is not increased due to the self-locking function and a speed increase ratio is zero (a stationary state in which the sun gear used as the input side is not able to rotate).

In a self-locking method of the speed reducer in the present disclosure as described above, the speed reducer includes: the carrier rotated as an input side, the first sun gear provided concentrically with the carrier, the first planetary gear engaged with the first sun gear, the second planetary gear engaged with the first planetary gear, the third planetary gear engaged with the second planetary gear, and the second sun gear concentric with the carrier, provided in parallel to the first sun gear, and engaged with the third planetary gear, wherein difference between the number of teeth of the first sun gear and the number of teeth of the second sun gear is at least one; the first, second, and third planetary gears are supported at different locations on one side of the carrier so as to be able to rotate and revolve and be disposed in n sets; the carrier is the input side; the first sun gear is a fixed side; the second sun gear is an output side; Z1 is defined as the number of teeth of the first sun gear; and Z2 is defined as the number of teeth of the second sun gear,
- wherein when Z1<Z2 and (Z2−Z1)<Z1 are satisfied, an output of the second sun gear is deceleration in the same direction;
- when Z1>Z2 and (Z1−Z2)<Z2 are satisfied, the output of the second sun gear is deceleration in a reverse direction; and
- when only one of the deceleration conditions is satisfied and the second sun gear is rotated by being changed to an input side, speed is not increased due to a self-locking function and a speed increase ratio is zero (a stationary state in which the sun gear used as the input side is not able to rotate).

Meanwhile, in the self-locking method of the speed reducer according to another aspect of the present disclosure, the speed reducer includes: the carrier rotated as an input side, the first sun gear provided concentrically with the carrier, the first planetary gear engaged with the first sun gear, the second planetary gear engaged with the first planetary gear, the third planetary gear engaged with the second planetary gear, and the second sun gear concentric with the carrier, provided in parallel to the first sun gear, and engaged with the third planetary gear, wherein difference between the number of teeth of the first sun gear and the number of teeth of the second sun gear is at least one; the first, second, and third planetary gears are supported at different locations on one side of the carrier so as to be able to rotate and revolve and be disposed in n sets; the carrier is the input side; the second sun gear is a fixed side; the first sun gear is an output side; Z1 is defined as the number of teeth of the first sun gear; and Z2 is defined as the number of teeth of the second sun gear,
- wherein when Z1>Z7 and (Z1−Z2)<Z2 are satisfied, an output of the first sun gear is deceleration in the same direction;
- when Z1<Z2 and (Z7−Z1)<Z1 are satisfied, the output of the first sun gear is deceleration in a reverse direction; and
- when only one of the deceleration conditions is satisfied and the first sun gear is rotated by being changed to an input side, speed is not increased due to a self-locking function and a speed increase ratio is zero (a stationary state in which the sun gear used as the input side is not able to rotate).

Advantageous Effects

As described above, the present disclosure relates to the speed reducer that can realize various gear speed ratios from high-ratio deceleration to low-ratio deceleration and is composed of only external gears without a ring gear so that difficulty in manufacturing is eliminated and space is reduced, thereby reducing manufacturing costs, and enabling mass production due to ease of processing. In addition, the self-locking function of the speed reducer prevents reversal, thereby enabling easy control and various uses.

DESCRIPTION OF DRAWINGS

FIG. 3b is a cross-sectional view taken line V-V according to FIG. 3a.

FIG. 4b is a cross-sectional view taken line I-I according to FIG. 4a.

FIG. 8c is a side view illustrating a side according to FIG. 8a.

BEST MODE

The above and other objectives and new features of the present disclosure will become clearer with the description and accompanying drawings of the present specification.

Hereinafter, an embodiment according to the present disclosure will be described according to the accompanying drawings.

Figure 1:
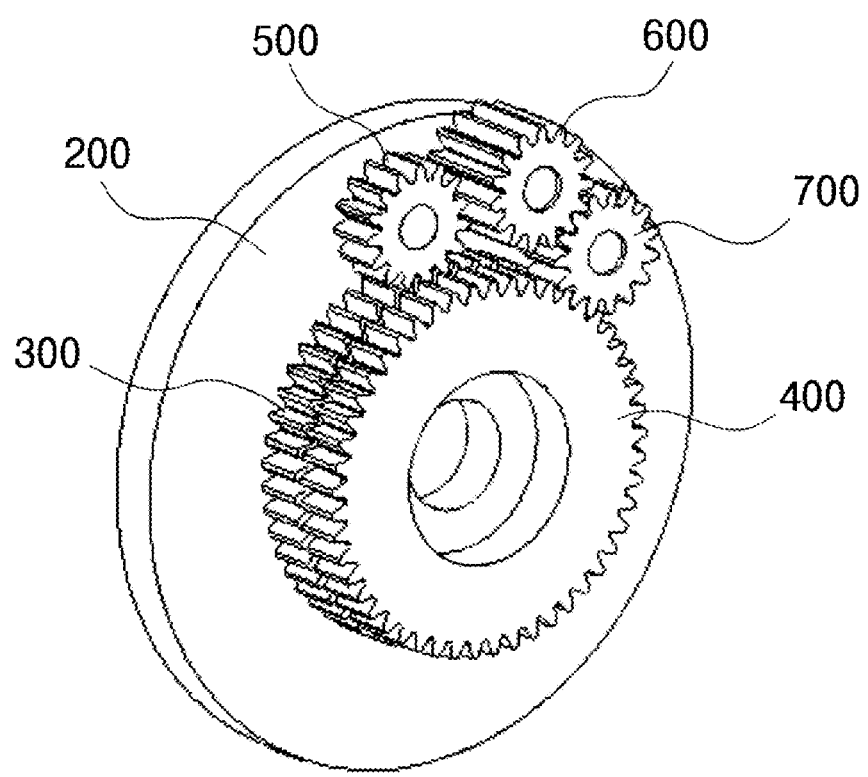
FIG. 1 is a perspective view of a speed reducer having a self-locking function without a ring gear according to the present disclosure.
Figure 2:
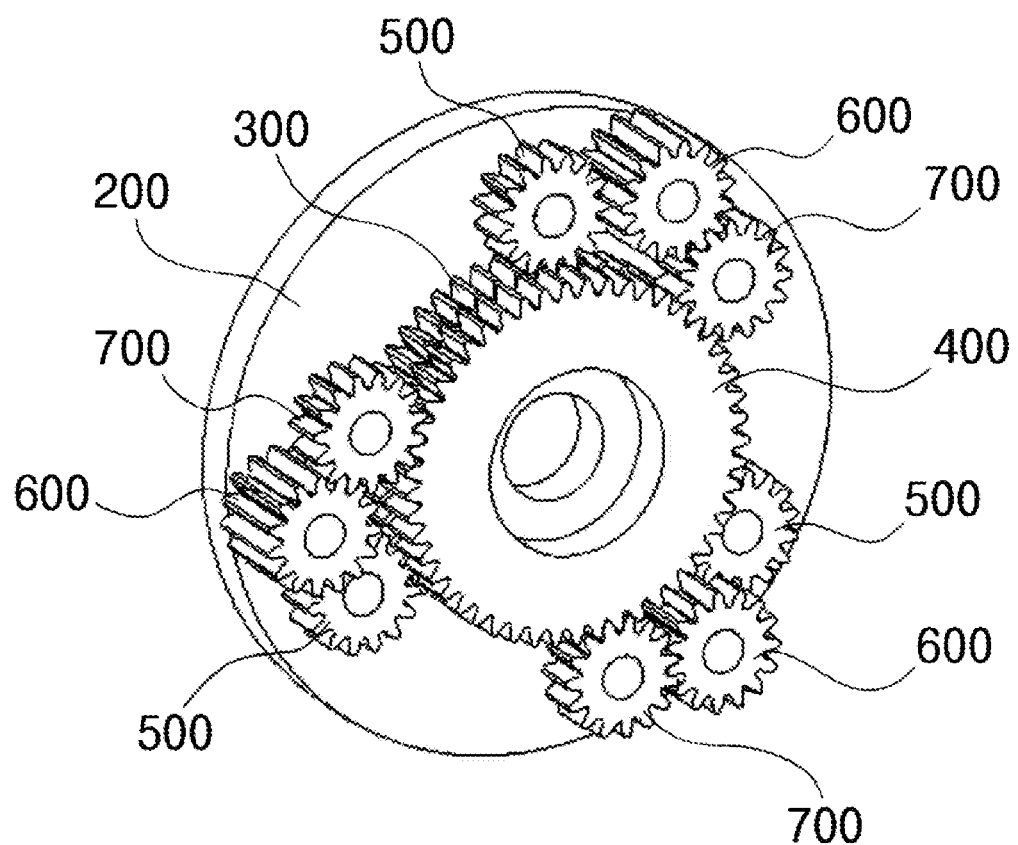
FIG. 2 is a perspective view illustrating the configuration of the number of n sets of planetary gears having a straight toothed portion according to an embodiment of the present disclosure.

FIG. 1 is a perspective view of a speed reducer having a self-locking function without a ring gear according to the present disclosure, and FIG. 2 is a perspective view illustrating the configuration of the number of n sets of planetary gears having a straight toothed portion according to the embodiment of the present disclosure.

The speed reducer according to the present disclosure is a speed reducer realized from a high ratio to a low ratio without a ring gear, and as illustrated in FIGS. 1 and 2, includes a carrier 200 rotated as an input side, a first sun gear 300 provided concentrically with the carrier 200, a first planetary gear 500 engaged with the first sun gear 300, a second planetary gear 600 engaged with the first planetary gear 500, a third planetary gear 700 engaged with the second planetary gear 600, and a second sun gear 400 concentric with the carrier 200, provided in parallel to the first sun gear 300, and engaged with the third planetary gear 700.

Difference between the number of teeth of the first sun gear 300 and the number of teeth of the second sun gear 400 is at least one, the first, second, and third planetary gears 500, 600, and 700 are supported at different locations on one side of the carrier 200 so as to be able to rotate and revolve and be disposed in n sets, and the circumference of teeth of the second planetary gear 600 is separated from the circumference of each of the first sun gear 300 and the second sun gear 400. Meanwhile, in FIG. 2, three sets of the first, second, and third planetary gears 500, 600, and 700 are illustrated to be provided, but the configuration of the planetary gears is not limited thereto, and two or at least four sets of planetary gears may be provided.

In the speed reducer according to the present disclosure, as a first type, the carrier 200 may function as an input side, the first sun gear 300 may be fixed, and the second sun gear 400 may function as an output side. In addition, in a planetary gear device according to the present disclosure, as a second type, the carrier 200 may be the input side, the second sun gear 400 may be fixed, and the first sun gear 300 may function as an output side.

In addition, in the speed reducer according to the present disclosure, the first and second sun gears 300 and 400, and the first, second, and third planetary gears 500, 600, and 700 may be provided in the same module.

Meanwhile, in the speed reducer according to the present disclosure, the first and second sun gears 300 and 400, and the first, second, and third planetary gears 500, 600, and 700 may be provided in the form of any one of an involute tooth, a cycloidal tooth, a straight tooth, and a spiral tooth.

Next, in the speed reducer according to the present disclosure, a gear speed ratio and a self-locking function will be described with reference to FIGS. 3 and 4.

Figure 3A:
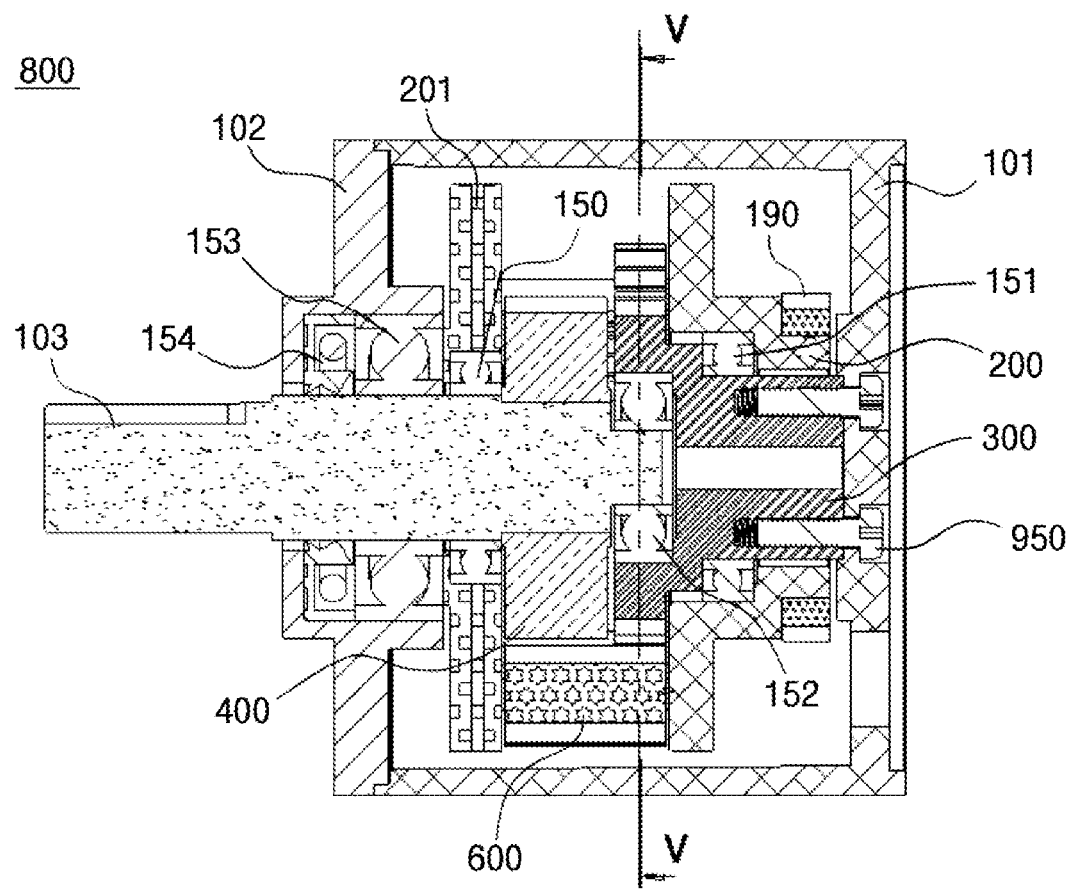
FIG. 3a is a cross-sectional view illustrating the gear speed ratio of a first type and a self-locking function according to the embodiment of the present disclosure.
Figure 3B:
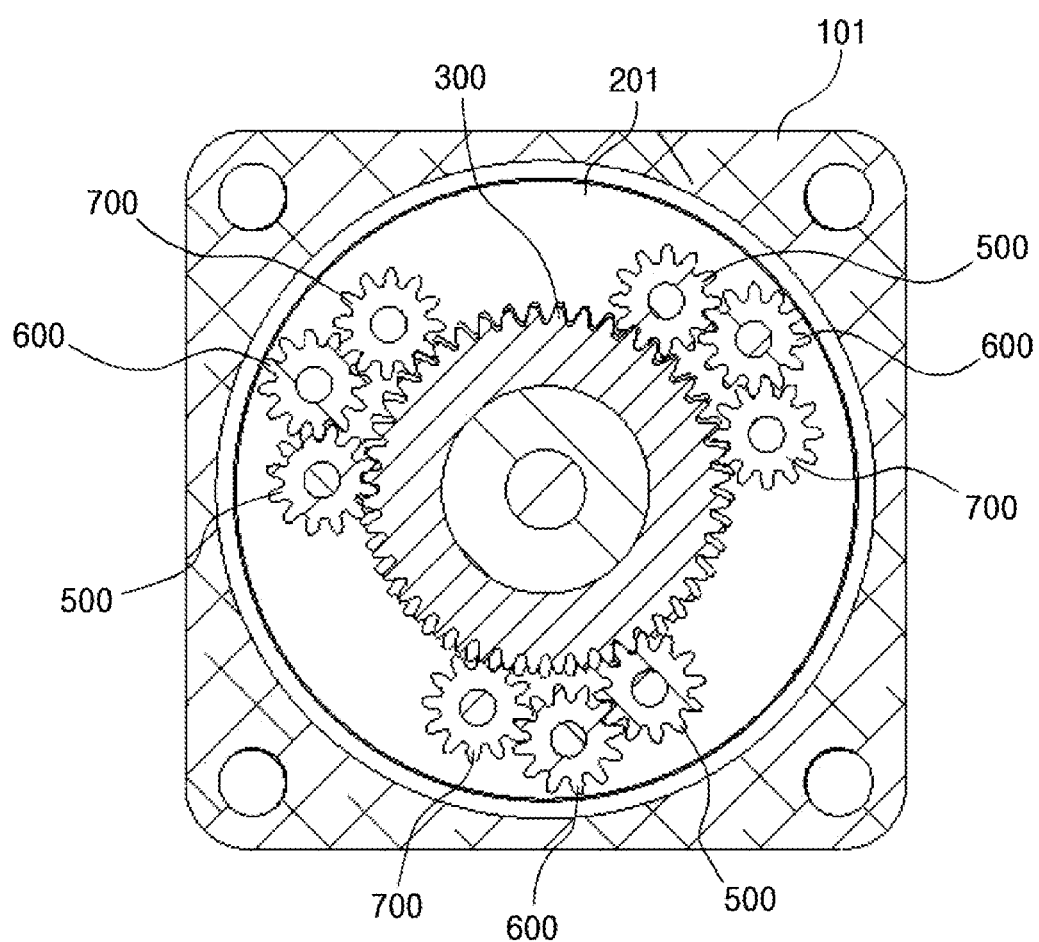
Figure 4A:
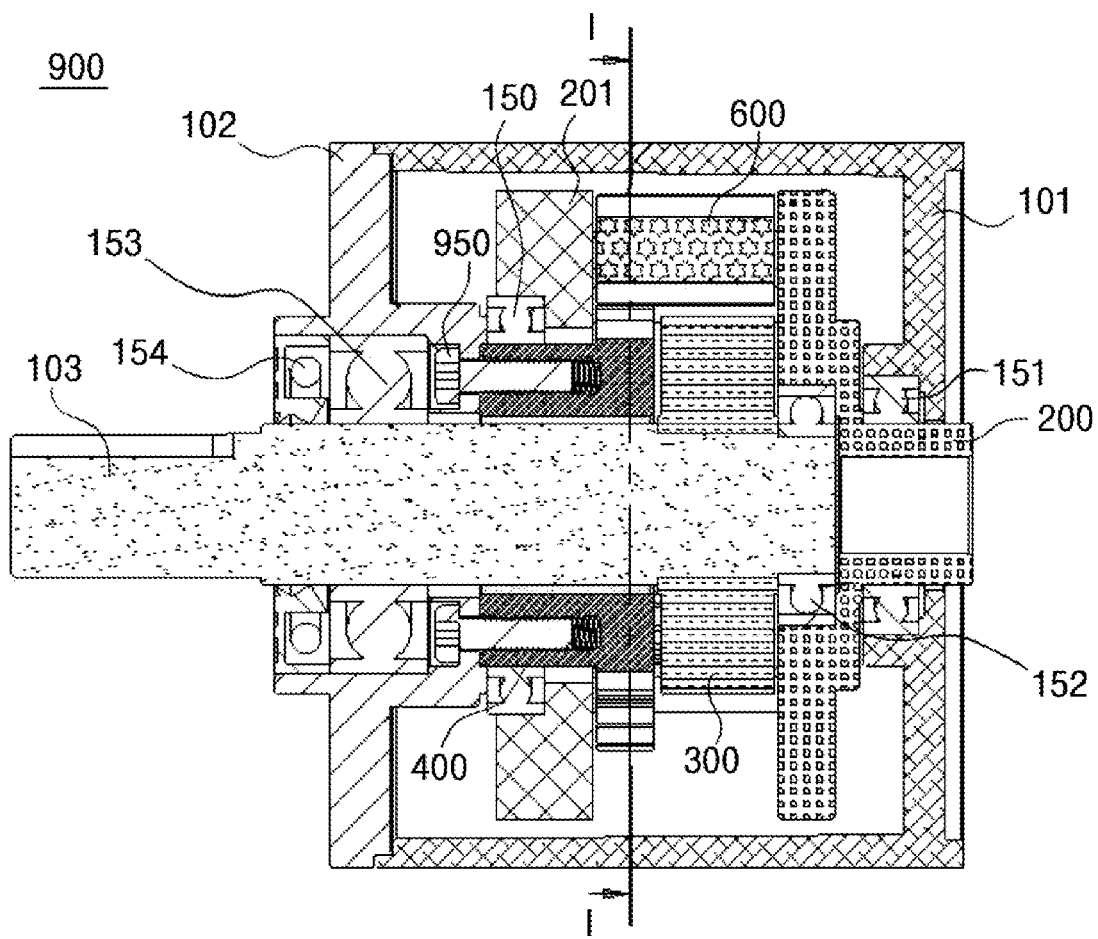
FIG. 4a is a cross-sectional view illustrating the gear speed ratio of a second type and a self-locking function according to the embodiment of the present disclosure.
Figure 4B:
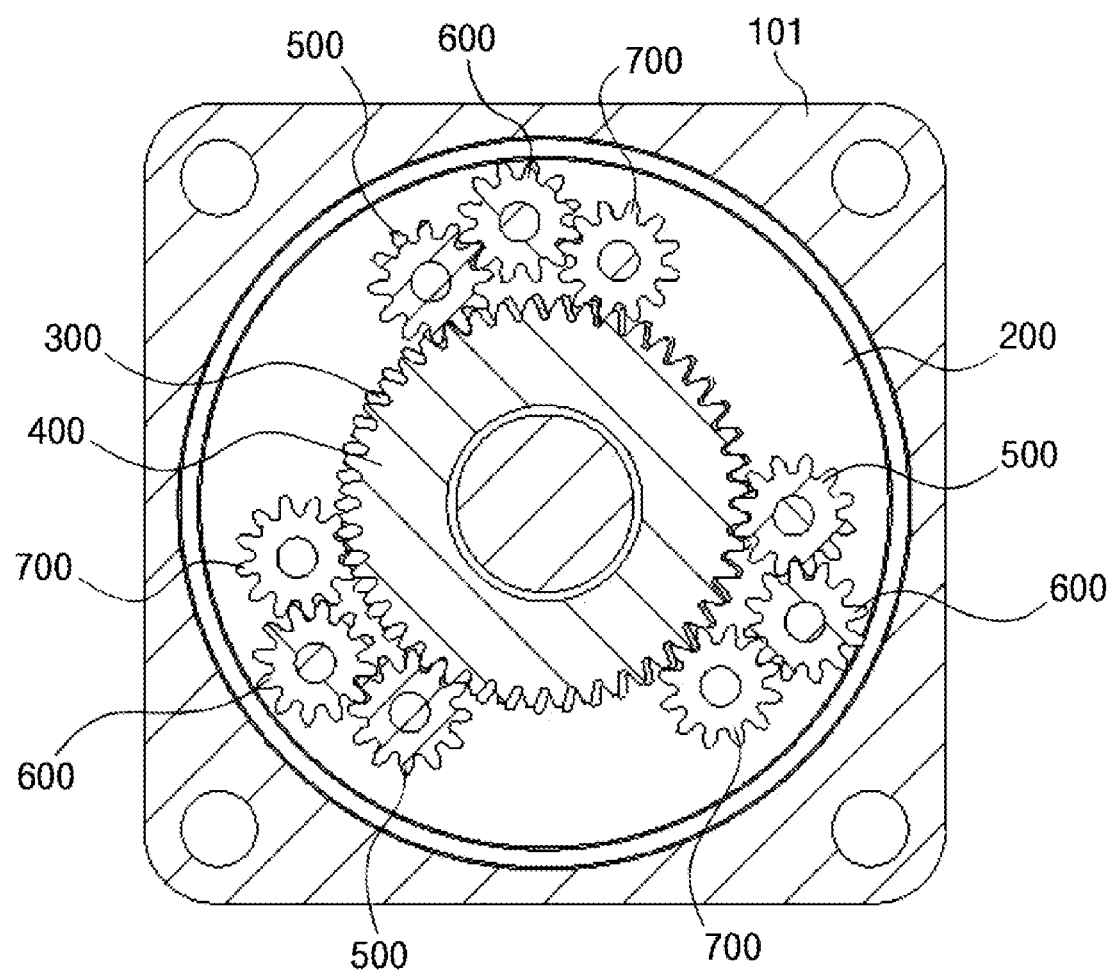

FIG. 3a is a cross-sectional view illustrating the gear speed ratio of a first type and a self-locking function according to the embodiment of the present disclosure, FIG. 3b is a cross-sectional view taken line V-V according to FIG. 3a, and FIG. 4a is a cross-sectional view illustrating the gear speed ratio of a second type and a self-locking function according to the embodiment of the present disclosure, and FIG. 4b is a cross-sectional view taken line I-I according to FIG. 4a.

As illustrated in FIGS. 3a, 3b, 4a, and 4b, the speed reducer according to the present disclosure includes the carrier 200, the first sun gear 300, the second sun gear 400, the first planetary gear 500, the second planetary gear 600, and the third planetary gear 700. According to the positions of the input, output, and fixing of the carrier 200, the first sun gear 300, and the second sun gear 400, the gear speed ratio is divided into the gear speed ratios of the first type 800 illustrated in FIG. 3 and the second type 900 illustrated in FIG. 4, and according to the number of the teeth of the first sun gear 300 and the number of the teeth of the second sun gear 400, different directions and speeds are output.

As illustrated in FIGS. 3a and 3b, in the gear speed ratio of the first type 800, when the carrier 200 connected to an input gear 190 rotates, the first planetary gear 500 supported on the carrier 200 rotates the second planetary gear 600 engaged with the first planetary gear 500 while rotating and revolving around the first sun gear 300 coupled to a fixed housing 101 by a bolt 950, the second planetary gear 600 rotates the third planetary gear 700 engaged with the second planetary gear 600, the third planetary gear 700 rotates the second sun gear 400 engaged with the third planetary gear 700, so that together with the second sun gear 400, a shaft 103 is rotated to be output. Meanwhile, in FIG. 3, reference numeral 201 refers to a carrier rotation support.

In this case, the third planetary gear 700 rotates by the same number of teeth as the first planetary gear 500, and thus when the carrier 200 rotates one time, the second sun gear 400 performs relative rotational motion to the fixed first sun gear 300 as much as difference in the number of teeth therebetween. The difference in the number of teeth between the number of the teeth of the first sun gear 300 and the number of the teeth of the second sun gear 400 is difference in the number of rotations between the input side and the output side. This is the gear speed ratio of the first type 800.

The gear speed ratio of the first type 800 illustrated in FIG. 3 is expressed as Equation (1-1) below.

$$R1=Z2/(Z2-Z1)  \quad \text{Equation (1-1)}$$

(Here, R1: a gear speed ratio of the first type, Z1: the number of the teeth of the first sun gear, and Z2: the number of the teeth of the second sun gear)

In the gear speed ratio of the first type 800, when the number of the teeth of the second sun gear 400 is greater than the number of the teeth of the first sun gear 300 and a value obtained by subtracting the number of the teeth of the first sun gear 300 from the number of the teeth of the second sun gear 400 is smaller than the number of the teeth of the first sun gear 300, the direction and speed of output are deceleration in the same direction. When the number of the teeth of the second sun gear 400 is greater than the number of the teeth of the first sun gear 300 and a value obtained by subtracting the number of the teeth of the second sun gear 400 from the number of the teeth of the first sun gear 300 is smaller than the number of the teeth of the second sun gear 400, the direction and speed of output is deceleration in a reverse direction.

To summarize the above,
when $Z1<Z2$ and $(Z2-Z1)<Z1$ are satisfied, an output is decoration in the same direction, and
when $Z1>Z2$ and $(Z1-Z2)<Z2$ are satisfied, an output is deceleration in a reverse direction,
(Here, Z1: the number of teeth of the first sun gear, and Z2: the number of teeth of the second sun gear).

As shown in Table 1 below, in Example 1, when the number of teeth of the first sun gear 300 is 49 and the number of teeth of the second sun gear 400 is 50, a gear speed ratio is 50/(50−49)=50/1, and when the input carrier 200 rotates 50 times, the output of the second sun gear 400 is one rotation, resulting in a high-ratio deceleration, and deceleration in the same direction in direction and speed.

In addition, in Example 2, when the number of teeth of the first sun gear 300 is 50 and the number of teeth of the second sun gear 400 is 26, a gear speed ratio is 26/(26−50)=(−1.08333), and when the input carrier 200 rotates −1.08333 times, the output of the second sun gear 400 is one rotation, resulting in a low-ratio deceleration, with a sign "−" meaning a reverse direction, and deceleration in a reverse direction in direction and speed.

The comparison of the examples is shown in Table 1. Table 1 shows the high and low ratios of the first type according to the embodiment of the present disclosure.

TABLE 1

| First type | Example 1 | Example 2 |
| --- | --- | --- |
| Z1 | 49 | 50 |
| Z2 | 50 | 26 |
| Gear speed ratio R1 | 50 | −1.08333 |
| Result | Deceleration in the same direction | Deceleration in a reverse direction |
| Note | High ratio | Low ratio |

In Table 1, the sign "−" means that output relative to an input rotation direction is reverse rotation. As can be seen from Table 1, it is easy to see that even if the number of teeth of gears is slightly changed, various gear ratios of high-ratio deceleration and low-ratio deceleration are achieved. Here, when the second sun gear 400 is changed into an input side and rotated, the second sun gear 400 rotates the third planetary gear 700 engaged with the second sun gear 400, the third planetary gear 700 rotates the second planetary gear 600 engaged with the third planetary gear 700, the second planetary gear 600 rotates the first planetary gear 500 engaged with the second planetary gear 600, and the first planetary gear 500 rotates the first sun gear 300 engaged with the first planetary gear 500.

In this case, since the first sun gear 300 is fixed and cannot be rotated, there occurs a phenomenon that the first planetary gear 500 tries to get out of engagement with the first sun gear 300 and tries to break away from a support point at which the carrier 200 supports the first planetary gear 500.

However, in this phenomenon, since the first planetary gear 500 cannot break away from the support point of the carrier 200 and cannot move away from engagement with the first sun gear 300, the first planetary gear 500 stops rotating on the fixed first sun gear 300, and thus the rotating of the first planetary gear 500 by changing the second sun gear 400 to the input side is not realized, resulting in a self-locking function of reversal prevention in which a speed increase ratio is zero in the impossible state of speed increase in which the rotating of the first planetary gear 500 stops.

More specifically, when any one of the first and second sun gears is changed to an input side, the sun gear is in a stationary state in which the sun gear cannot rotate even if the sun gear receives rotation input.

Here, a detailed explanation of reason for which the first planetary gear 500 does not rotate and power is not transmitted to the input of the second sun gear 400 is as follows.

Figure 9A:
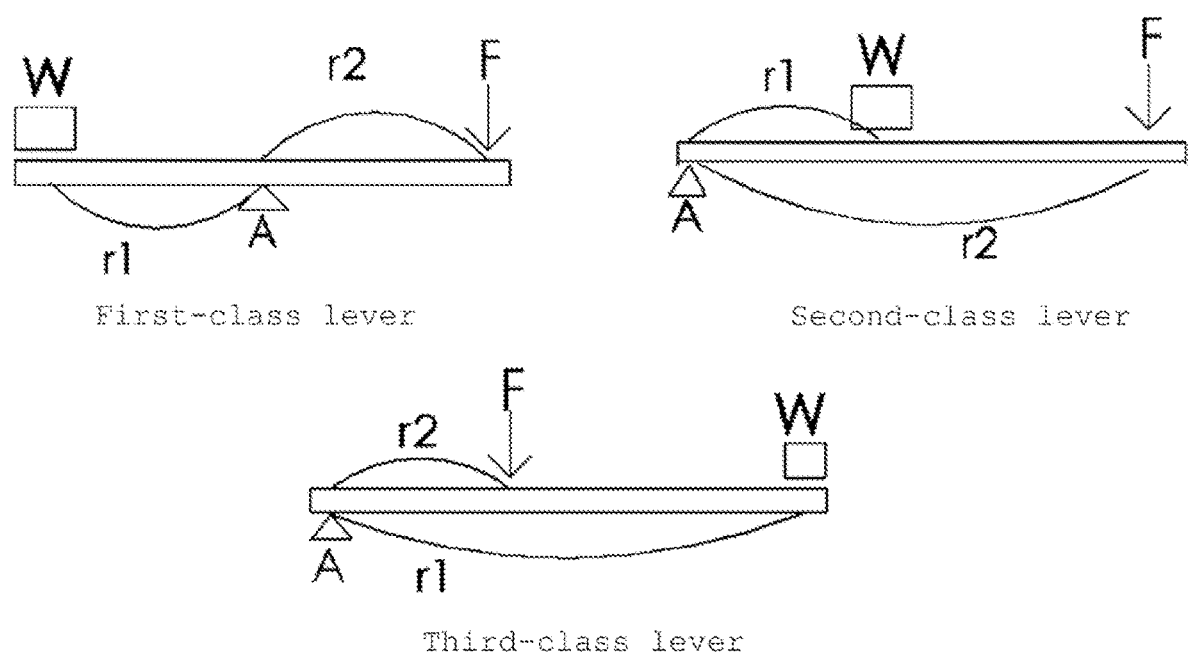
FIG. 9a is an example diagram for illustrating a general leverage principle.

The principle of leverage for rotation and revolution of a general planetary gear set is illustrated in FIG. 9a.

In FIG. 9a, F is force, W is a point of action, A is a fulcrum, and r1 and r2 are distances. The relational expression of the principle of three levers is W×r1=F×r2.

Figure 9B:
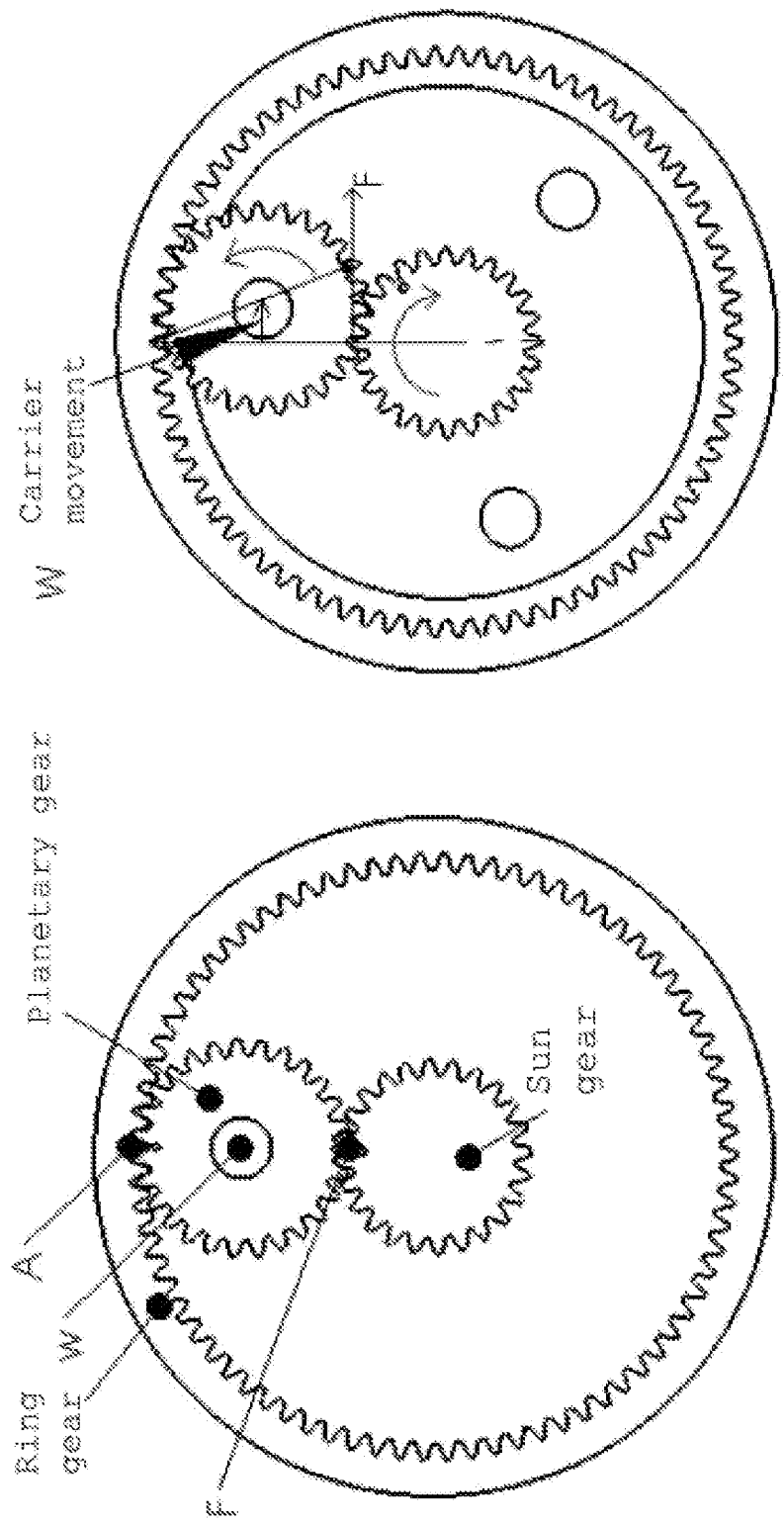
FIG. 9b is an example diagram illustrating the operation of a general planetary gear set and a ring gear.

Here, the rotation of the carrier of a general planetary gear set is shown in FIG. 9B below.

In the general planetary gear set of FIG. 9b, when a ring gear is fixed and a sun gear is rotated clockwise, a point F in FIG. 9b moves to the right, and the movement of the point F rotates a planetary gear (counterclockwise), and at the same time, the planetary gear decelerates while revolving clockwise concentrically with the circumference of the ring gear.

The revolution of the planetary gear rotates the carrier supported by the planetary gear as illustrated in FIG. 9b, and can be found in the principle of a second-class lever. In FIG. 9b, an instantaneous rotation center of the planetary gear is a point A, which is the same as a fulcrum point A in the second-class lever, a point F of the planetary gear is the same as a point of force F on the second-class lever, and a point W of the planetary gear is the same as an action point W in the second-class lever.

As the point of force F moves, the action point W moves, and the continuous movement of the action point rotates the carrier. In this case, when the force F is obtained, the force F is doubled since the action point W is the center of the planetary gear according to the relational equation of the principle of the second-class lever, so that the carrier can rotate efficiently with a small force F.

Meanwhile, when the carrier is changed to an input side to increase speed, the principle of third-class lever is applied, the center of the carrier is a force F, a point A is a fulcrum point A, a part at which the planetary gear and the sun gear are engaged with each other is an action point W, so it can be seen that the force F moving the action point W is doubled. When the cases of deceleration and speed increase are compared with each other, it can be seen that a rotational force F is much larger and the action point W is smaller in the case of speed increase than in the case of deceleration.

Figure 5:
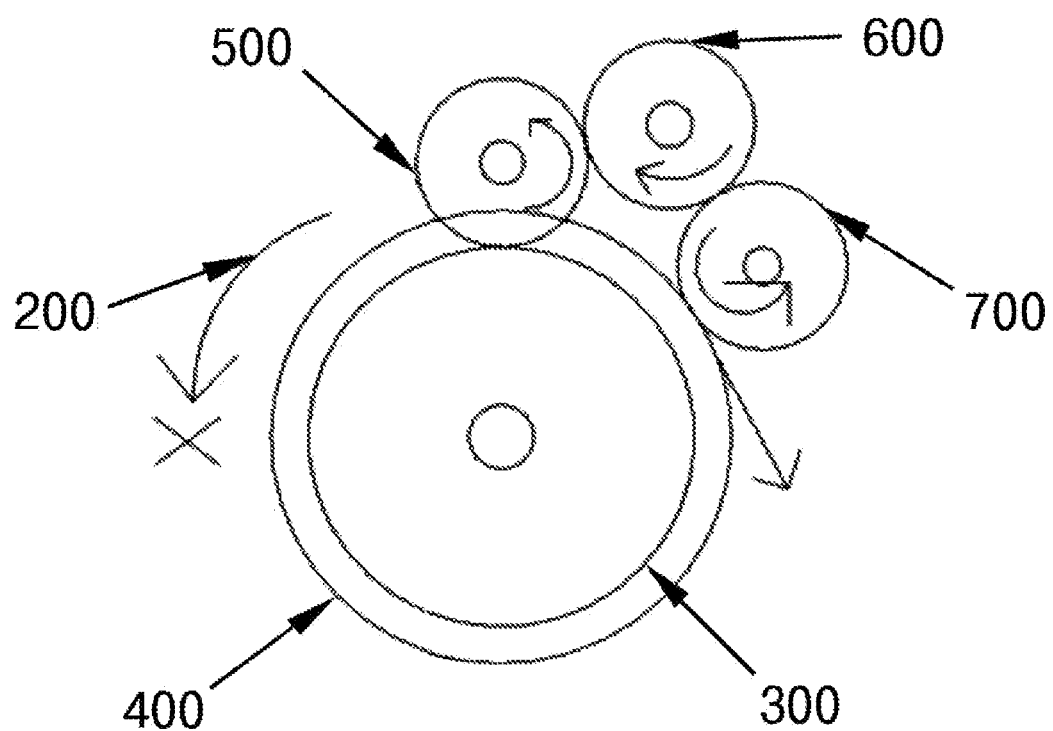
FIG. 5 is an example diagram illustrating the interpretation of rotation and revolution in the present disclosure.

When applying the interpretation of rotation and revolution in a general speed reducer to the present disclosure, as illustrated in FIG. 5, in a case in which the first sun gear 300 of the present disclosure is fixed and the second sun gear 400 is changed to an input side to rotate (clockwise), the third planetary gear 700 and the first planetary gear 500 rotate counterclockwise as illustrated in FIG. 5, and the carrier 200 by which the first planetary gear 500 rotating counterclockwise is supported to revolve around the first sun gear 300 is also rotated counterclockwise.

However, in the gear speed ratio of the first type 800 of the present disclosure, when the carrier 200 is an input side, the first sun gear 300 is a fixed side, the second sun gear 400 is an output side, Z1 is defined as the number of the teeth of the first sun gear 300, Z2 is defined as the number of the teeth of the second sun gear 400, and Z1<Z2 and (Z2−Z1) <Z1, the output of the second sun gear is "deceleration in the same direction", so the clockwise rotation of the carrier 200 is the clockwise rotation of the second sun gear 400.

Figure 6:
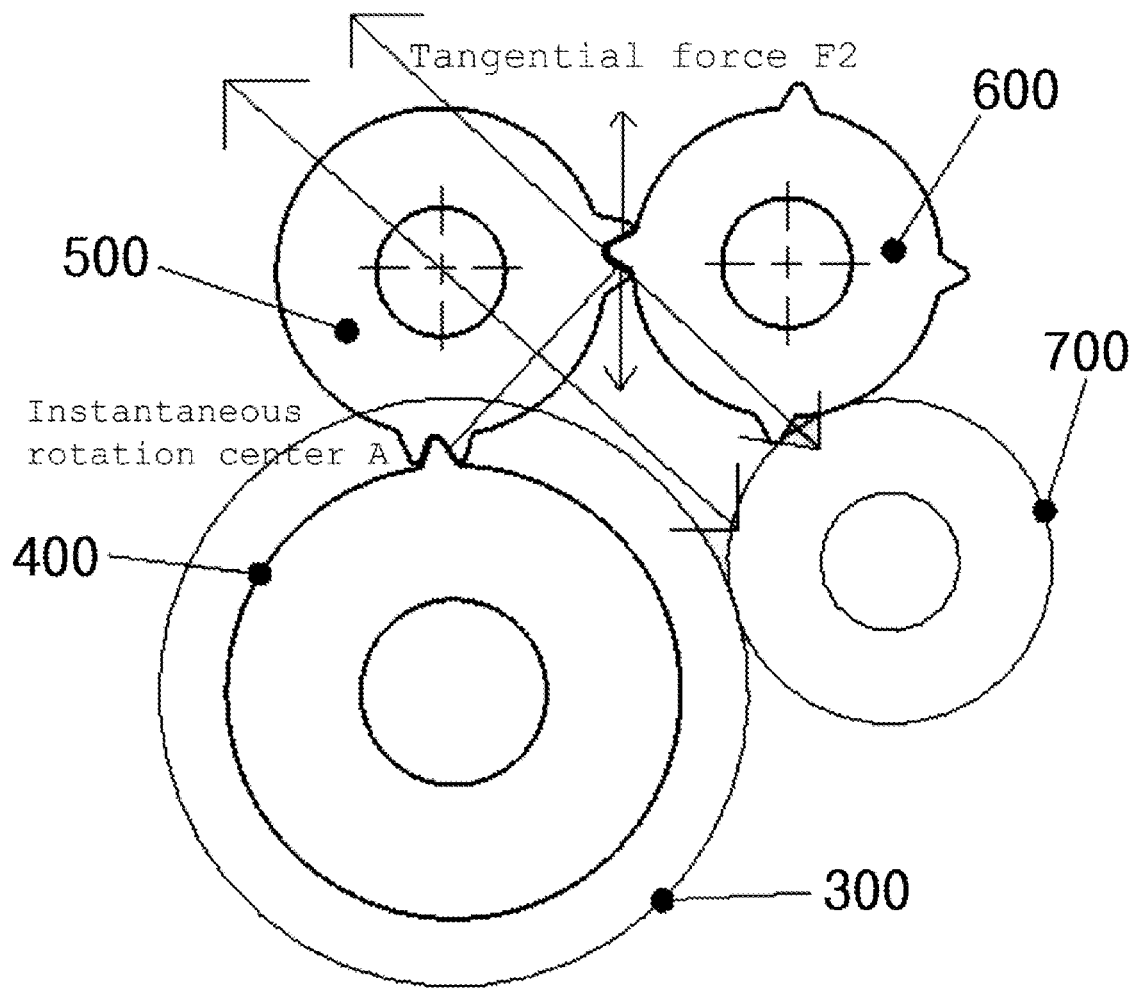
FIG. 6 is an example diagram for interpreting the principle of a self-locking method, which is the technical gist of the present disclosure.

According to the interpretation of the self-locking principle of the present disclosure, as illustrated in FIG. 6, in a case in which the second sun gear 400 is stationary, as the first sun gear 300 rotates, the rotation of the first planetary gear 500 is about to occur. Since the second sun gear 400 is fixed, a point at which the first planetary gear 500 and the second sun gear 400 are engaged with each other is the instantaneous rotation center A, and the tangential force of the first planetary gear 500 includes a separating tangential force F1 rotating relative to the instantaneous rotation center A and a rotating tangential force F2 engaged with the second planetary gear 600.

For example, to obtain the number of rotations of each planetary gear,
Z1 is the number of teeth of the first sun gear 300,
Z2 is the number of teeth of the second sun gear 400,
Z5 is the number of teeth of the first planetary gear 500,
Z6 is the number of teeth of the second planetary gear 600, Z7 is the number of teeth of the third planetary gear 700,
when the carrier 200 rotates one time as an input side, Z1=50, Z2=45, Z5=15, Z6=15, and Z7=15,
the number of rotations of the first planetary gear 500 is 1+(Z2/Z5), which is 4 rotations,
the number of rotations of the second planetary gear 600 is 1−(Z2/Z6), which is (−) 2 rotations,
the number of rotations of the third planetary gear 700 is 1+(Z2/Z7), which is 4 rotations, and
the number of rotation of the first sun gear 300 is 1−(Z2/Z1), which is 1/10.

Here, when the first sun gear 300 is rotated in a reverse direction,
the first planetary gear 500 rotates 40 times, which increases speed,
the second planetary gear 600 rotates (−) 20 times, which increase speed, and
the third planetary gear 700 rotates 40 times, which increases speed.

However, in FIG. 6, while a force F1 for the first planetary gear 500 to break away from the support of the carrier relative to the instantaneous rotation center A is large, the tangential force of F2 becomes a very small rotational force due to increased speed.

Accordingly, the first planetary gear 500 does not rotate and stops, and the carrier 200 also does not rotate since the support point of the carrier breaks away from a center thereof and is in a stationary state, so that a self-locking function is performed.

In the gear speed ratio of the second type, as illustrated in FIGS. 4a and 4b, when the carrier 200 rotates as an input side, the third planetary gear 700 supported on the carrier 200 rotates the second planetary gear 600 engaged with the third planetary gear 700 while rotating and revolving around the second sun gear 400 coupled to a fixed housing cover 102 by the bolt 950, the second planetary gear 600 rotates the first planetary gear 500 engaged with the second planetary gear 600, the first planetary gear 500 rotates the first sun gear 300 engaged with the first planetary gear 500, so that together with the first sun gear 300, the shaft 103 is rotated to be output.

In this case, the first planetary gear 500 rotates by the same number of teeth as the third planetary gear 700, and thus when the carrier 200 rotates one time, the first sun gear 300 performs relative rotational motion to the fixed second sun gear 400 as much as difference in the number of teeth therebetween. The difference in the number of teeth between the first sun gear 300 and the second sun gear 400 is difference in the number of rotations between input and output. This is the gear speed ratio of the second type 900.

The gear speed ratio of the second type 900 is expressed as Equation (1-2) below.

$$R2=Z1/(Z1-Z2) \qquad \text{Equation (1-2)}$$

(Here, R2: the gear speed ratio of the second type, Z1: the number of teeth of the first sun gear, and Z2: the number of teeth of the second sun gear)

In the gear speed ratio of the second type 900, when the number of the teeth of the first sun gear 300 is greater than the number of the teeth of the second sun gear 400 and a value obtained by subtracting the number of the teeth of the second sun gear 400 from the number of the teeth of the first sun gear 300 is smaller than the number of the teeth of the second sun gear 400, the direction and speed of an output are deceleration in the same direction, but when the number of the teeth of the second sun gear 400 is greater than the number of the teeth of the first sun gear 300 and a value obtained by subtracting the number of the teeth of the first sun gear 300 from the number of the teeth of the second sun gear 400 is smaller than the number of the teeth of the first sun gear 300, the direction and speed of an output are deceleration in a reverse direction. The above is summarized as, when Z1>Z2 and (Z1−Z2)<Z2 are satisfied, an output is deceleration in the same direction, and when Z1<Z2 and (Z2−Z1)<Z1 are satisfied, an output is deceleration in a reverse direction (Here, Z1: the number of the teeth of the first sun gear, and Z2: the number of the teeth of the second sun gear).

For example, as shown in Table 2, in Example 5, when the number of the teeth of the first sun gear 300 is 100 and the number of the teeth of the second sun gear 400 is 99, a gear speed ratio is 100/(100−99)=100/1, and when the input carrier 200 rotates 100 times, the output of the first sun gear 300 is one rotation, resulting in a high-ratio deceleration ratio, and a direction and speed are deceleration in the same direction.

In addition, in Example 6, when the number of the teeth of the first sun gear 300 is 51 and the number of the teeth of the second sun gear 400 is 100, a gear speed ratio is 51/(51−100)=(−1.0408), and when the input carrier 200 rotates −1.0408 times, the output of the first sun gear 300 is one rotation, resulting in a low-ratio deceleration ratio, and (−) means a reverse direction and a direction and speed are deceleration in a reverse direction.

The comparison of the examples is shown in Table 2. Table 2 shows the examples of high and low ratios of the second type according to the embodiment of the present disclosure.

TABLE 2

| Second type | Example 5 | Example 6 |
| --- | --- | --- |
| Z1 | 100 | 51 |
| Z2 | 99 | 100 |
| Gear speed ratio R2 | 100 | −1.0408 |
| Result | Deceleration in the same direction | Deceleration in a reverse direction |
| Note | High ratio | Low ratio |

In Table 2, the sign "−" means that an output relative to an input rotation direction is reverse rotation.

As can be seen from Table 2 above, it is easy to see that high-ratio deceleration and low-ratio deceleration are achieved even if the number of teeth of gears is slightly changed.

Here, when the first sun gear 300 is changed to an input side and rotated, the first sun gear 300 rotates the first planetary gear 500 engaged with the first sun gear 300, the first planetary gear 500 rotates the second planetary gear 600 engaged with the first planetary gear 500, the second planetary gear 600 rotates the third planetary gear 700 engaged with the second planetary gear 600, and the third planetary gear 700 rotates the second sun gear 400 engaged with the third planetary gear 700.

In this case, since the second sun gear 400 is fixed and cannot be rotated, there occurs a phenomenon that the third planetary gear 700 tries to get out of engagement with the second sun gear 400 and tries to break away from a support point at which the carrier 200 supports the third planetary gear 700.

However, in this phenomenon, since the third planetary gear 700 cannot break away from the support point of the carrier 200 and cannot move away from engagement with the second sun gear 400, the third planetary gear 700 stops rotating on the fixed second sun gear 400, and thus the rotating of the third planetary gear 700 by changing the first sun gear 300 to the input side is not realized, resulting in a self-locking function of reversal prevention in which a speed increase ratio is zero in the impossible state of speed increase in which the rotating of the first planetary gear 500 stops.

More specifically, when any one of the first and second sun gears is changed to an input side, the sun gear is in a stationary state in which the sun gear cannot rotate even if the sun gear receives rotation input.

Here, the self-locking function of reversal prevention in which the third planetary gear 700 does not rotate and power is not transmitted to the input of the first sun gear 300 is illustrated in FIG. 6, and accordingly, detailed description thereof will be omitted.

In the planetary gear device according to the present disclosure, the above-mentioned gears 300, 400, 500, 600, and 700 can adjust center distances so that both standard gears and front gears can be manufactured without any constraints, and the planetary gear device consists only of external gears, so those skilled in the art can easily manufacture the device. That is, in order to manufacture gears, the number of teeth of each gear is selected, and it is possible to select how many sets of the first, second, and third planetary gears 500, 600, and 700 will be arranged at equal intervals.

In the speed reducer according to the present disclosure, according to the number of teeth of the first sun gear 300 and the number of teeth of the second sun gear 400, a gear speed ratio is determined, and there is a correlation between the number of the teeth and the number of the sets of the planetary gears arranged at equal intervals. Accordingly, when a value obtained by subtracting the number of the teeth of the second sun gear 400 from the number of the teeth of the first sun gear 300 is designated as a multiple of the number n of sets of the planetary gears, the number of teeth of the first sun gear 300 and the number of teeth of the second sun gear 400 may be determined as shown in the following Equation (1-3).

$$Z1-Z2=\text{a multiple of } n \quad \text{(Equation 1-3)}$$

(Here, Z1: the number of teeth of the first sun gear, Z2: the number of teeth of the second sun gear, and n: the number of sets of planetary gears)

In general, when the number Z1 of teeth of the first sun gear 300 is set as an arbitrary value, the number of planetary gear sets is a multiple of n, and the approximate value of a target gear ratio is searched for and selected in order to arrange n (1, 2, 3, 4, 5) sets of the planetary gears at equal intervals, the number Z2 of teeth of the second sun gear 400 is determined by Equation (1-3), and the number of teeth of the first, second, and third planetary gears 500, 600, and 700 may be freely selected to be the same so that the sets do not overlap.

Figure 7:
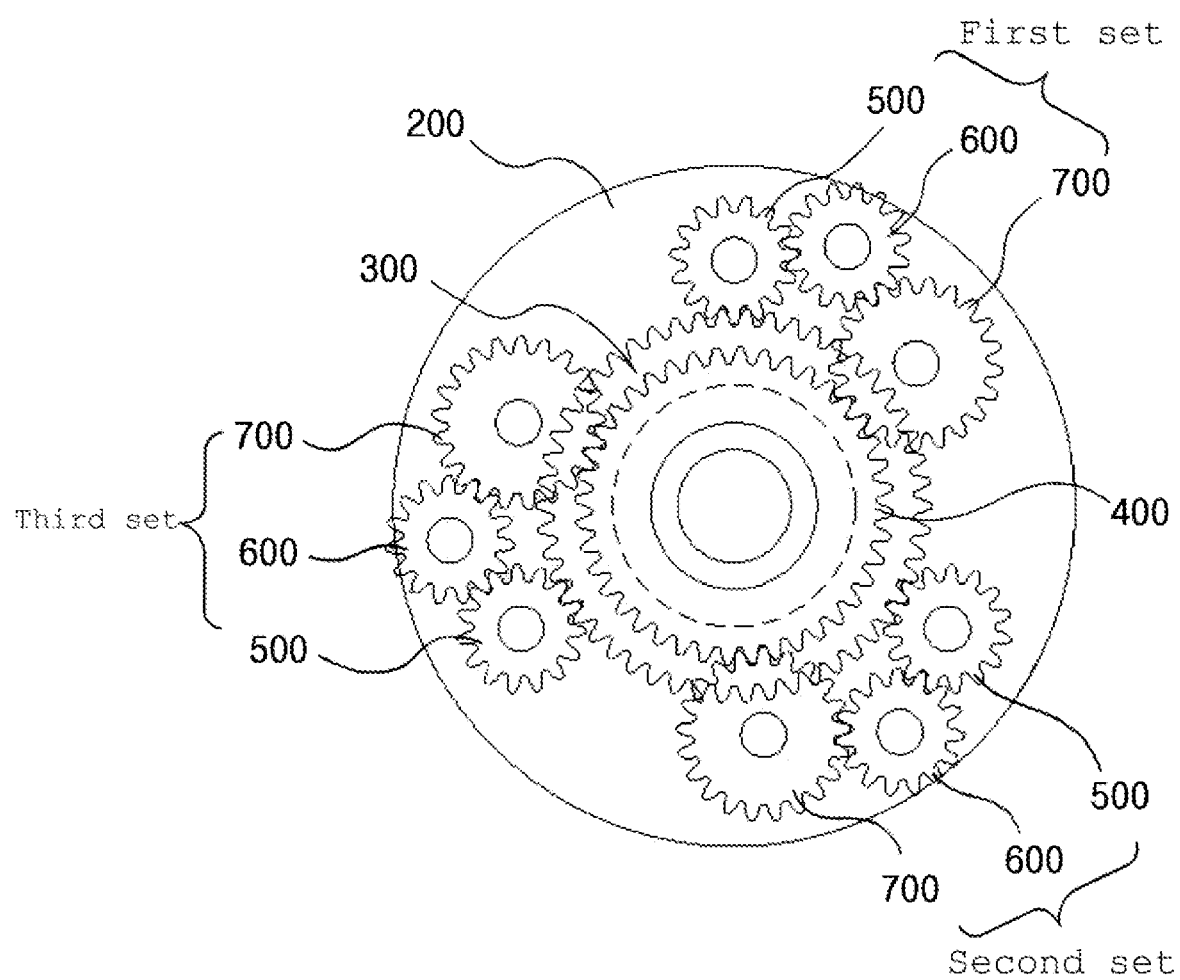
FIG. 7 is a front view illustrating the arrangement of n sets of planetary gears arranged at equal intervals according to the embodiment of the present disclosure.

For example, like the embodiment illustrated in FIG. 7, when the number n of sets of planetary gears is 3, the number of teeth of the first sun gear 300 is randomly set to be 50, the number of teeth of the second sun gear 400 is selected, n has 3, 6, 9, and 12 as positive multiples, and −3, −6, −9, and −12 as negative multiples according to Equation (1-3). FIG. 7 is a front view illustrating the arrangement of n sets of planetary gears arranged at equal intervals according to the embodiment of the present disclosure.

Accordingly, when the number of teeth of the second sun gear 400 is selected on the basis of positive multiples, there are 53, 56, 59, and 62, etc., and when the number of teeth of the second sun gear 400 is selected on the basis of negative multiples, there are 47, 44, 41, and 38, etc. Among them, the number of teeth suitable for the approximate value of a target gear ratio may be selected.

In the embodiment as illustrated in FIG. 7, the number of teeth of the second sun gear 400 is selected as 41, the number of teeth of a first set of first, second, and third planetary gears 500, 600, and 700 is randomly selected as 15, 15, and 21, respectively, since the number of teeth of a second set of first, second, and third planetary gears 500, 600, and 700 is required to be the same as the number of teeth of the first set of planetary gears 500, 600, and 700, the number of teeth of a second set of first, second, and third planetary gears 500, 600, and 700 is also selected as 15, 15, and 21, respectively, and the number of teeth of a third set of first, second, and third planetary gears 500, 600, and 700 may also be selected as 15, 15, and 21, respectively. Here, although the number of teeth of planetary gears may be freely selected as 12, 13 14, 15, . . . 20, 21, . . . 32, and 33, etc., the planetary gears are required to be manufactured without overlapping of gear teeth or engagement with other parts in parts not shown in the embodiment. This is information that anyone skilled in the art can easily understand, and thus will be omitted without being specifically mentioned.

Additionally, for example, when selecting the number of teeth of the first sun gear 300 after the number n of sets of the first, second, and third planetary gears 500, 600, and 700 is 5 and the number of teeth of the second sun gear 400 is randomly selected as 51, since according to the above Equation (1-3), the positive multiples of 5 sets are equal to 5, 10, and 15, etc., and the negative multiples thereof are equal to −5, −10, and −15, etc., the number of teeth of the first sun gear 300 is selected as 56, 61, and 66, etc. by applying the positive multiples, and the number of teeth of the first sun gear 300 is selected as 46, 41, and 36, etc. by applying the negative multiples. Among them, the number of teeth suitable for the approximate value of a target gear ratio may be selected. Even here, the number of teeth of the planetary gears may be freely selected as described above.

Next, the engagement of gears according to the number of planetary gear sets will be described with reference to FIG. 8.

Figure 8A:
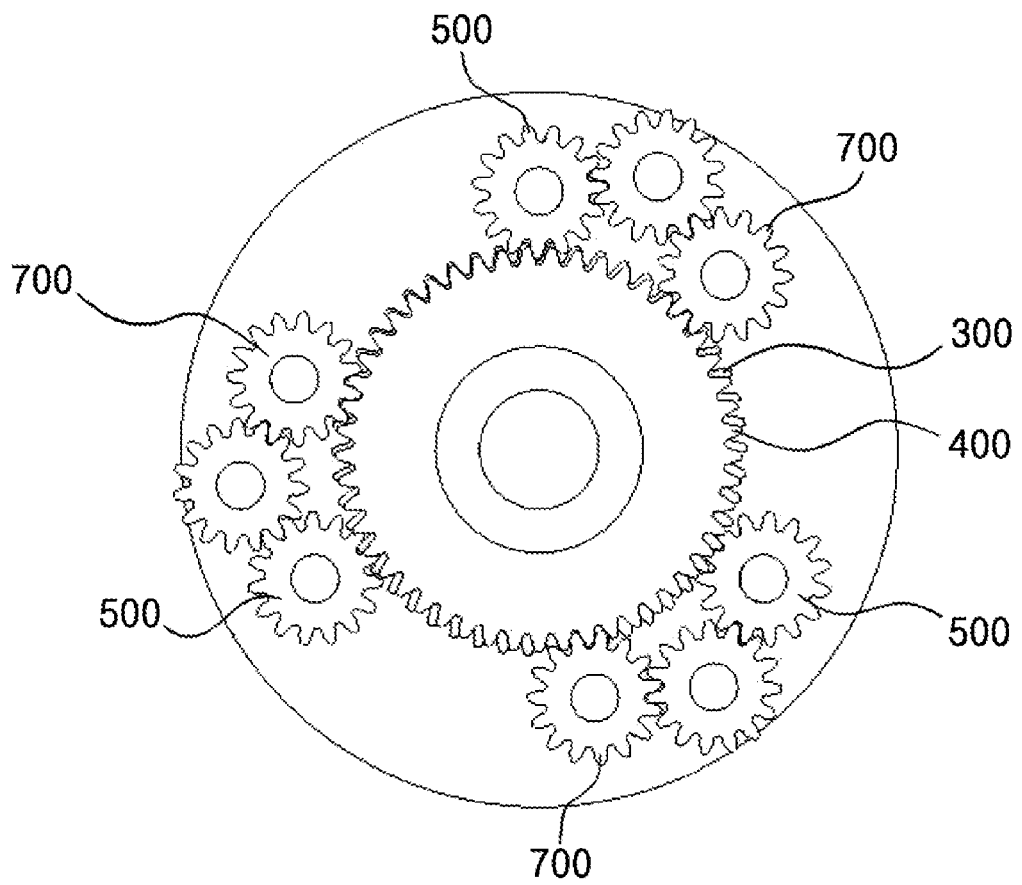
FIG. 8a is a front view illustrating the arrangement of n sets of planetary gears after changing an intervening angle according to the embodiment of the present disclosure.
Figure 8B:
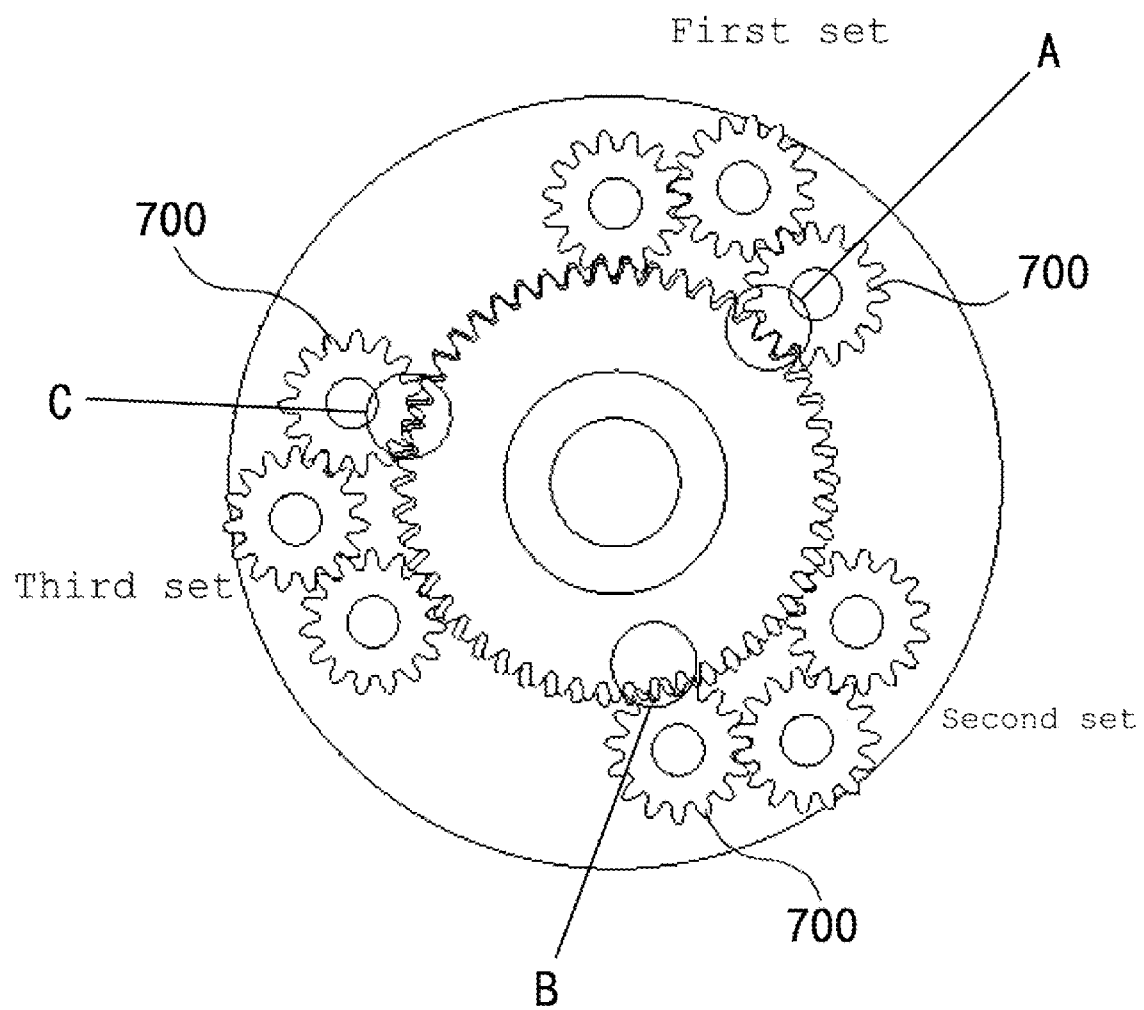
FIG. 8b is a front view illustrating an impossibility of the engagement of gear teeth before changing an intervening angle according to an embodiment of the present disclosure.
Figure 8C:
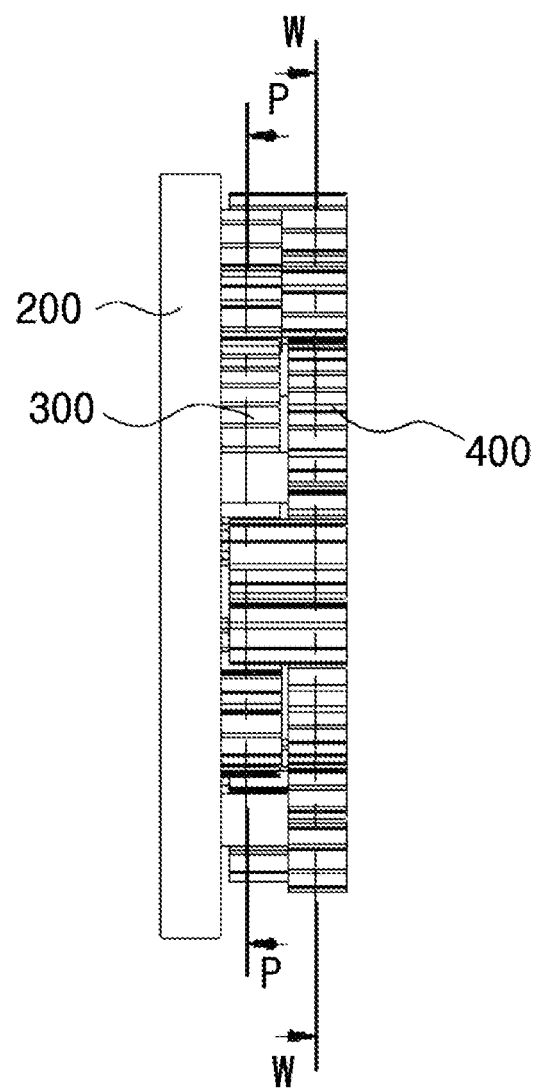
Figure 8D:
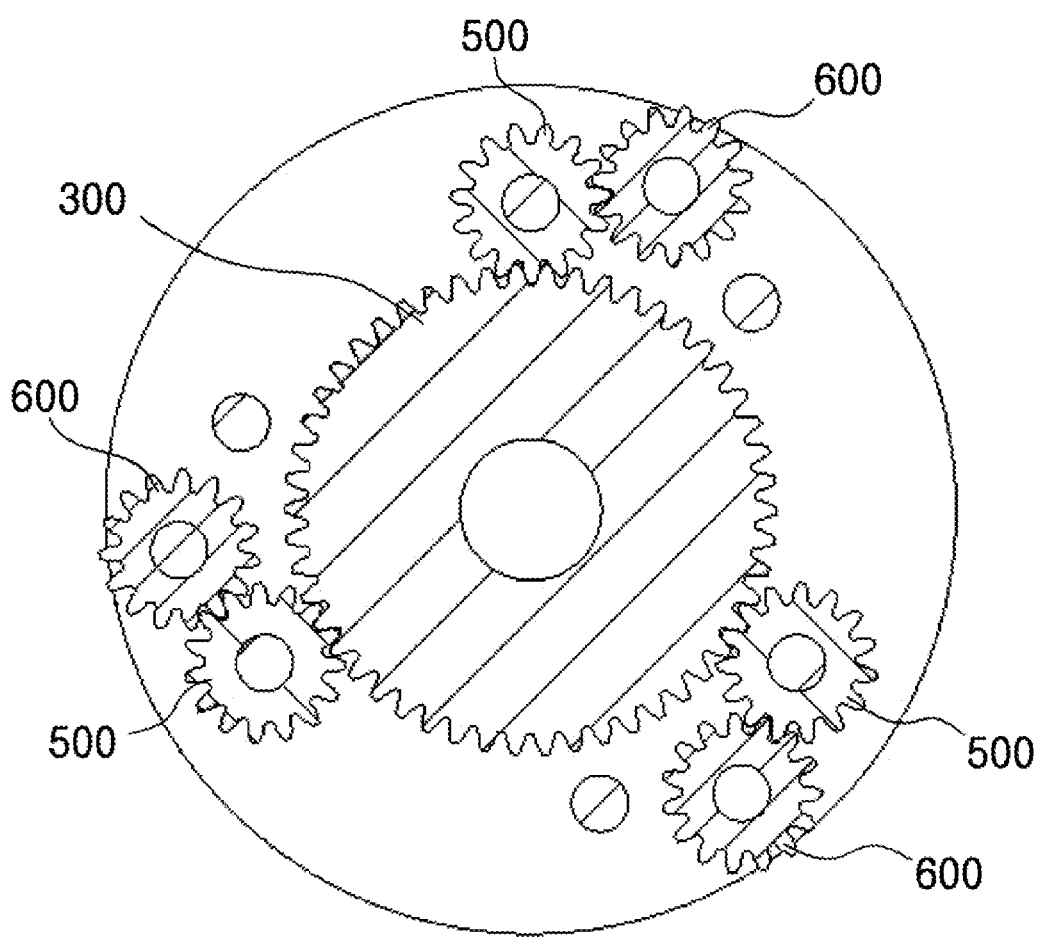
FIG. 8d is a cross-sectional view taken along line P-P according to FIG. 8c.
Figure 8E:
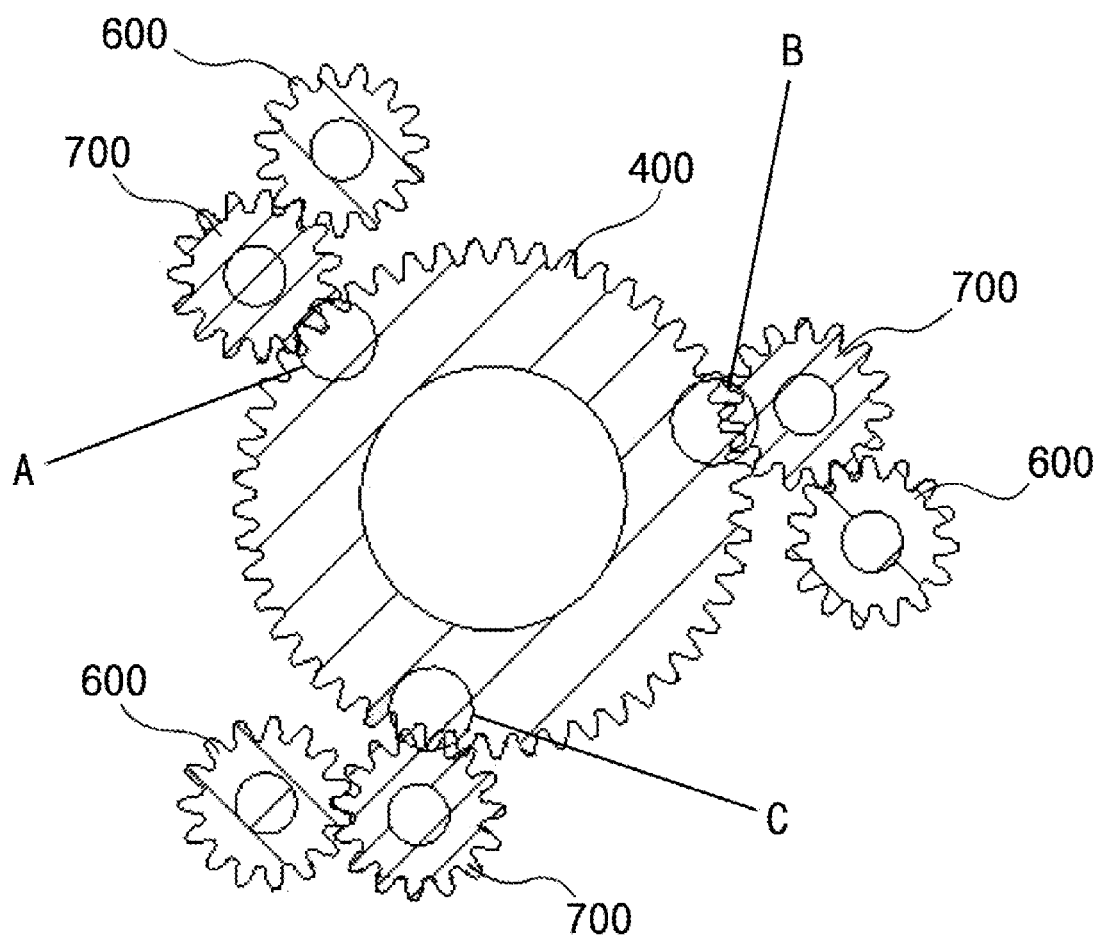
FIG. 8e is a cross-sectional view taken along line W-W according to FIG. 8c.
Figure 8F:
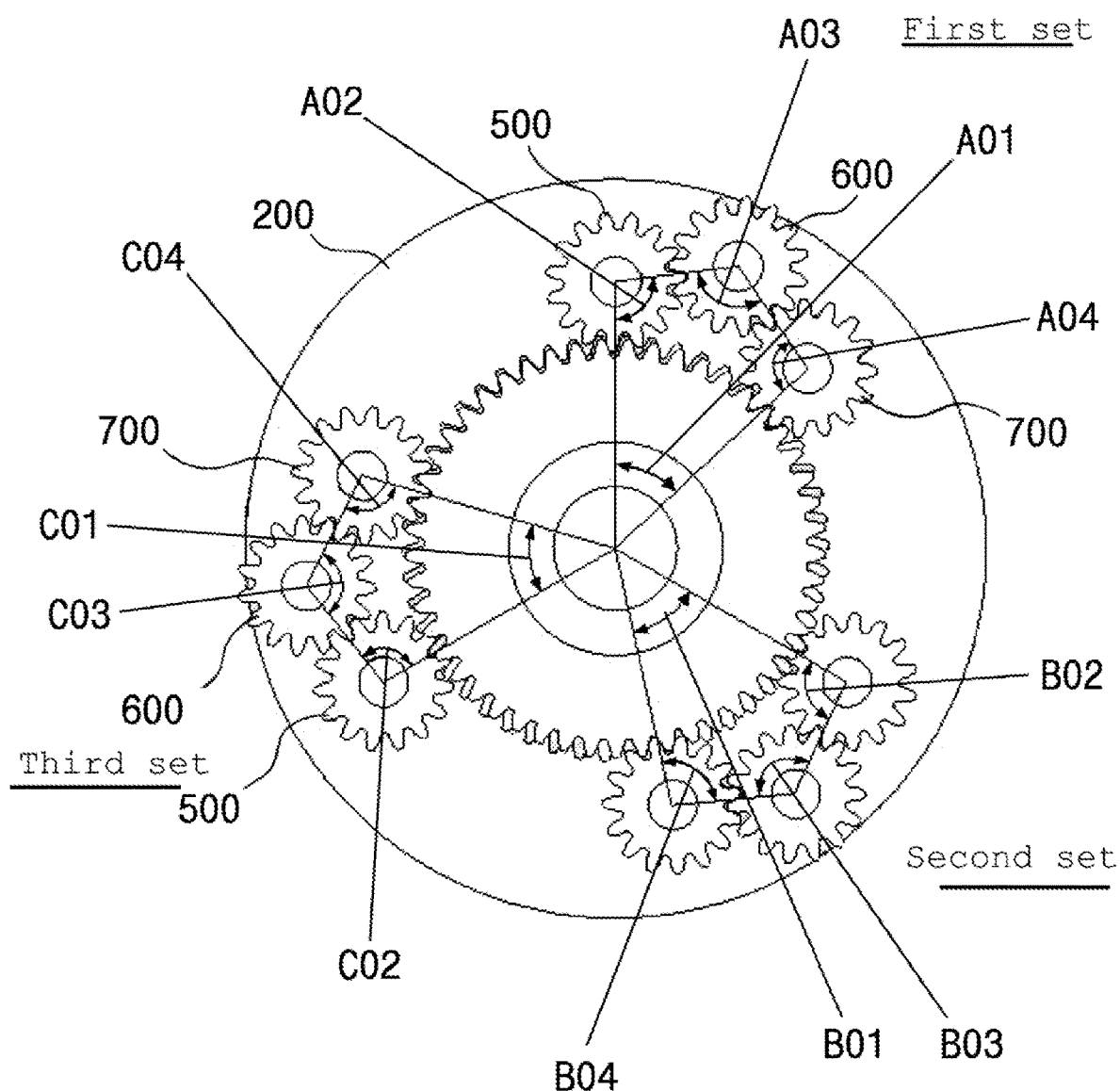
FIG. 8f is a front view illustrating a position of an intervening angle according to the embodiment of the present disclosure.

FIG. 8a is a front view illustrating the arrangement of n sets of planetary gears after changing an intervening angle according to the embodiment of the present disclosure, FIG. 8b is a front view illustrating an impossibility of the engagement of gear teeth before changing an intervening angle according to the embodiment of the present disclosure, FIG. 8c is a side view illustrating a side according to FIG. 8a, FIG. 8d is a cross-sectional view taken along line P-P according to FIG. 8c, FIG. 8e is a cross-sectional view taken along line W-W according to FIG. 8c, FIG. 8f is a front view illustrating a position of an intervening angle according to the embodiment of the present disclosure. In addition, in FIG. 8, A represents a normal position at which gear teeth are engaged with each other, B represents a position at which gear teeth cannot be engaged with each other, and C represents a position at which gear teeth cannot be engaged with each other.

In the embodiment illustrated in FIG. 8a, it is illustrated that the number of teeth of the first sun gear 300 is 50, the number of teeth of the second sun gear 400 is 49, and the number n of sets of the planetary gears is 3, and gear teeth are exactly engaged with each other between the gears.

Since difference between the number of teeth of the first sun gear 300 and the number of teeth of the second sun gear 400 is 1, the number of sets of planetary gears is required to be 1 according to the above Equation (1-3). However, as illustrated in FIGS. 8b to 8f, when three sets of planetary gears are arranged at equal intervals, there is no problem of engagement of gear teeth in only a position A of the first set as illustrated in FIG. 8b, but gear teeth cannot be engaged with each other in a position B of the second set and a position C of the third set and cannot be assembled.

In addition, as described above, when difference in the number of teeth of the sun gears is one, a maximum gear speed ratio is achieved, and when the number of sets of planetary gears is only one, there is no problem at low speed, but in high speed, excessive vibration occurs and durability deteriorates, which inevitably causes problems.

Accordingly, in order to solve the above problems, as in the embodiment illustrated in FIG. 8f, in the carrier 200, by using "change in an intervening angle" of straight lines connecting between the centers of gears, the number of sets of planetary gears is determined as n regardless of the condition of the above Equation (1-3).

First, as illustrated in FIG. 8f, the "change in an intervening angle" is to change an angle between straight lines connecting between the centers of gears at the position of the first set, the position of the second set, or the position of the third set in the carrier 200. For example, the "change in an intervening angle" is to change an angle A03 between a straight line connecting between the center of the first planetary gear 500 and the center of the second planetary gear and a straight line connecting between the center of the third planetary gear and the center of the second planetary gear, relative to the second planetary gear 600 at the position of the first set.

As illustrated in FIG. 8f, the positions of "the intervening angle" are four places of A01, A02, A03, and A04 at the position of the first set, are four places of B01, B02, B03, B04 even at the position of the second set, and are four places of C01, C02, C03, C04 even at the position of the third set. In FIG. 8f, A01 is an angle between a straight line connecting between the center of the third planetary gear at the position of the first set and the center of the carrier and a straight line connecting between the center of the first planetary gear at the position of the first set and the center of the carrier, A02 is an angle between a straight line connecting between the center of the carrier and the center of the first planetary gear at the position of the first set and a straight line connecting between the center of the first planetary gear and the center of the second planetary gear, and A03 is an angle between a straight line connecting between the center of the first planetary gear and the center of the second planetary gear at the position of the first set and a straight line connecting between the center of the third planetary gear and the center of the second planetary gear at the position of the first set, and A04 is an angle between a straight line connecting between the center of the third planetary gear at the position of the first set and the center of the carrier and a straight line connecting between the center of the second planetary gear and the center of the third planetary gear at the position of the first set.

In addition, B01 is an angle between a straight line connecting between the center of the third planetary gear at the position of the second set and the center of the carrier and a straight line connecting between the center of the first planetary gear at the position of the second set and the center of the carrier, B02 is an angle between a straight line connecting between the center of the first planetary gear at the position of the second set and the center of the carrier and a straight line connecting between the center of the first planetary gear and the center of the second planetary gear at the position of the second set, B03 is an angle between a straight line connecting between the center of the first planetary gear and the center of the second planetary gear at the position of the second set and a straight line connecting between the center of the third planetary gear and the center of the second planetary gear at the position of the second set, and B04 is an angle between a straight line connecting between the center of the third planetary gear at the position of the second set and the center of the carrier and a straight line connecting between the center of the second planetary gear and the center of the third planetary gear at the position of the second set.

In addition, C01 is an angle between a straight line connecting between the center of the third planetary gear at the position of the third set and the center of the carrier and a straight line connecting between the center of the first planetary gear at the position of the third set and the center of the carrier, C02 is an angle between a straight line connecting between the center of the first planetary gear at the position of the third set and the center of the carrier and a straight line connecting between the center of the first planetary gear and the center of the second planetary gear at the position of the third set, C03 is an angle between a straight line connecting between the center of the first planetary gear and the center of the second planetary gear at the position of the third set and a straight line connecting between the center of the third planetary gear and the center of the second planetary gear at the position of the third set, and C04 is an angle between a straight line connecting between the center of the third planetary gear at the position of the third set and the center of the carrier and a straight line connecting between the center of the second planetary gear and the center of the third planetary gear at the position of the third set.

Among the sets, at a set at which gear tooth engagement is impossible, the problem of the impossibility of gear tooth engagement can be eliminated by changing one angle of four intervening angles. In addition, regardless of the number of teeth of the first sun gear 300 and the second sun gear 400 in the above Equation (1-3), the number of sets of planetary gear may be increased or decreased.

For example, as in the embodiment illustrated in FIG. 8*b*, parts at which gear teeth cannot be engaged with each other are a part B at the position of the second set and a part C at the position of the third set, and accordingly, the problem of the gear tooth disengagement of the part B at the position of the second set may be solved by changing one of the angles of B01, B02, B03, and B04 at the position of the second set in FIG. 8*f*, and the problem of the gear tooth disengagement of the part C at the position of the third set in FIG. 8*b* may be solved by changing one of the angles of C01, C02, C03, and C04 at the position of the third set in FIG. 8*f*.

For a specific example of the part C at the position of the third set, when the center of the second planetary gear 600 at the position of the third set supported by the carrier 200 is moved in a direction opposite to the center of the carrier 200, the second planetary gear 600 rotates around the first planetary gear 500 while the angle C03 between the straight line connecting between the center of the first planetary gear 500 and the center of the second planetary gear 600 and the straight line connecting between the center of the third planetary gear 700 and the center of the second planetary gear 600 is changed, and rotates the third planetary gear 700 engaged with the second planetary gear 600, and thus gear teeth which cannot be engaged with each other are rotated and moved by the thickness of the teeth so as to be engaged with tooth space of each of mating gears.

In "the change in intervening angle", when the number of sets of planetary gears is n, in the remaining sets except for one set in which gear teeth are exactly engaged with each other, only a part with which gear teeth interfere is changed, and the number of parts that requires "the change in an intervening angle" will be at most n−1. Here, four intervening angles are formed at the positions of the first, second, third sets, respectively, and it has been mentioned in the above description that only one of the four intervening angles in each of the sets is required to be changed.

This is because when one intervening angle is set or changed according to a "trigonometric function" and "second law of cosines", remaining intervening angles are automatically set or changed.

In the embodiment illustrated in FIGS. 8*b* and 8*e*, as for parts at which gear toot engagement is impossible in the part B and the part C, in FIG. 8*f*, the problem of the interference of gear tooth engagement is solved by changing the angles of B02 and C02. The angle of B02 is changed from 97 degrees before the change of the angle to 95.4 degrees after the change, and the angle of C02 is changed from 97 degrees before the change of the angle to 98.6 degrees after the change, and accordingly, it can be seen that the problem of the impossibility of gear tooth engagement through "the change in the intervening angles" can be eliminated, and the number of sets of planetary gears can be increased or decreased.

In the embodiment, the change in the intervening angles of B02 and C02 is not limited to the embodiments, and 97 degrees before the change in the intervening angles and 98.6 degrees and 95.4 degrees after the change in the intervening angles are not limited to the values of the embodiments, but are changed according to the increase or decrease of the number of teeth of the sun gears and the number of sets of planetary gears, and the change of the positions of the planetary gears.

In summary, the technology of the present disclosure relates to the speed reducer having a self-locking function that can realize various gear speed ratios from high-ratio deceleration to low-ratio deceleration without a ring gear, and includes the carrier rotated as an input side, the first sun gear provided concentrically with the carrier, the first planetary gear engaged with the first sun gear, the second planetary gear engaged with the first planetary gear, the third planetary gear engaged with the second planetary gear, and the second sun gear concentric with the carrier, provided in parallel to the first sun gear, and engaged with the third planetary gear. Difference between the number of teeth of the first sun gear and the number of teeth of the second sun gear is at least one, and the first, second, and third planetary gears are supported at different locations on one side of the carrier so as to be able to rotate and revolve and be disposed in n sets, and when fixing any one of the first sun gear and the second sun gear and switching and one remaining sun gear into an input side, speed is not increased due to a self-locking function and a speed increase ratio is zero.

For the implementation of the self-locking function, in a case in which the carrier is an input side, the first sun gear is fixed, the second sun gear is an output side, Z1 is defined as the number of teeth of the first sun gear, Z2 is defined as the number of teeth of the second sun gear, when $Z1<Z2$ and $(Z2-Z1)<Z1$ are satisfied, the output of the second sun gear is deceleration in the same direction, but when $Z1>Z2$ and $(Z1-Z2)<Z2$ are satisfied, the output of the second sun gear is deceleration in a reverse direction, and when only one of the above deceleration conditions is satisfied and the second sun gear is rotated by being changed to an input side, speed is not increased due to a self-locking function and a speed increase ratio is zero.

In addition, in a case in which the carrier is input, the second sun gear is fixed, the first sun gear is output, Z1 is defined as the number of teeth of the first sun gear, and Z2 is the number of teeth of the second sun gear, when $Z1>Z2$ and $(Z1-Z2)<Z2$ are satisfied, the output of the first sun gear is deceleration in the same direction, but when $Z1<Z2$ and $(Z2-Z1)<Z1$ are satisfied, the output of the first sun gear is deceleration in a reverse direction, and when only one of the deceleration conditions is satisfied and the first sun gear is rotated by being changed to an input side, speed is not increased due to a self-locking function and a speed increase ratio is zero.

Accordingly, in the speed reducer of the present disclosure in which deceleration is achieved, when an output side is changed to an input side to be used, speed is not increased due to a self-locking function and a speed increase ratio is zero, that is, the speed reducer is in a non-operating state.

As described above, the present disclosure relates to the speed reducer that can realize various gear speed ratios from high-ratio deceleration to low-ratio deceleration and is composed of only external gears without a ring gear so that difficulty in manufacturing is eliminated and space is reduced, thereby reducing manufacturing costs, and enabling mass production due to ease of processing. In addition, the self-locking function of the speed reducer prevents reversal, thereby enabling easy control and various uses.

As described above, it can be known that a basic technical idea of the present disclosure is to provide the speed reducer device having a self-locking function that is realized from a high ratio to a low ratio without a ring gear, and many other modifications are possible to those skilled in the art within the scope of the basic idea of the present disclosure.

DESCRIPTION OF THE REFERENCE NUMERALS IN THE DRAWINGS

101: Fixed housing
102: Fixed housing cover
150: Bearing
200: Carrier
201: Carrier rotation support
300: First sun gear
400: Second sun gear
500: First planetary gear
600: Second planetary gear
700: Third planetary gear
800: First type gear speed ratio
900: Second type gear speed ratio
950: Bolt

The invention claimed is:

1. A self-locking method of a speed reducer without a ring gear, wherein the speed reducer comprises:
   a carrier rotated as an input side,
   a first sun gear provided-concentrically with the carrier,
   a first planetary gear engaged with the first sun gear,
   a second planetary gear engaged with the first planetary gear,
   a third planetary gear engaged with the second planetary gear, and
   a second sun gear concentric with the carrier, provided in parallel to the first sun gear, and engaged with the third planetary gear,
   wherein a difference between the number of teeth of the first sun gear and the number of teeth of the second sun gear is at least one; the first, second, and third planetary gears are supported at different locations on one side of the carrier so as to be able to rotate and revolve and be disposed in n sets; the carrier is the input side; the first sun gear is a fixed side; Z1 is defined as the number of teeth of the first sun gear; and Z2 is defined as the number of teeth of the second sun gear, and
   wherein when $Z1<Z2$ and $(Z2-Z1)<Z1$ are satisfied, an output of the second sun gear is deceleration in the same direction; when $Z1>Z2$ and $(Z1-Z2)<Z2$ are satisfied, the output of the second sun gear is deceleration in a reverse direction,
   the method comprising, when the deceleration is in one of the same or reverse directions, rotating the second sun gear by being changed to the input side, such that speed is not increased due to a self-locking function and a speed increase ratio is zero.

2. A self-locking method of a speed reducer without a ring gear, wherein the speed reducer comprises:
   a carrier rotated as an input side,
   a first sun gear provided concentrically with the carrier,
   a first planetary gear engaged with the first sun gear,
   a second planetary gear engaged with the first planetary gear,
   a third planetary gear engaged with the second planetary gear, and
   a second sun gear concentric with the carrier, provided in parallel to the first sun gear, and engaged with the third planetary gear,
   wherein a difference between the number of teeth of the first sun gear and the number of teeth of the second sun gear is at least one; the first, second, and third planetary gears are supported at different locations on one side of the carrier so as to be able to rotate and revolve and be disposed in n sets; the carrier is the input side; the second sun gear is a fixed side; Z1 is defined as the number of teeth of the first sun gear; and Z2 is defined as the number of teeth of the second sun gear, and
   wherein when $Z1>Z2$ and $(Z1-Z2)<Z2$ are satisfied, an output of the first sun gear is deceleration in the same direction; when $Z1<Z2$ and $(Z2-Z1)<Z1$ are satisfied, the output of the first sun gear is deceleration in a reverse direction,
   the method comprising, when the deceleration is in one of the same or reverse directions, rotating the first sun gear by being changed to the input side, such that speed is not increased due to a self-locking function and a speed increase ratio is zero.

3. A speed reducer having a self-locking function without a ring gear, the speed reducer comprising:
   a carrier configured to rotate as an input side, a first sun gear provided concentrically with the carrier, a first planetary gear engaged with the first sun gear, a second planetary gear engaged with the first planetary gear, a third planetary gear engaged with the second planetary gear, and a second sun gear concentric with the carrier, provided in parallel to the first sun gear, and engaged with the third planetary gear, wherein a difference between the number of teeth of the first sun gear and the number of teeth of the second sun gear is at least one; the first, second, and third planetary gears are supported at different locations on one side of the carrier so as to be able to rotate and revolve and be disposed in n sets; the carrier is the input side; the first sun gear is a fixed side; the second sun gear is an output side; Z1 is defined as the number of teeth of the first sun gear; and Z2 is defined as the number of teeth of the second sun gear, and wherein when Z1<Z2 and (Z2−Z1)<Z1 are satisfied, an output of the second sun gear is deceleration in the same direction; when Z1>Z2 and (Z1−Z2)<Z2 are satisfied, the output of the second sun gear is deceleration in a reverse direction; and when the deceleration is in one of the same or reverse directions and the second sun gear is rotated by being changed to the input side, speed is not increased due to the self-locking function and a speed increase ratio is zero.

4. A speed reducer having a self-locking function without a ring gear, the speed reducer comprising:

a carrier configured to rotate as an input side, a first sun gear provided concentrically with the carrier, a first planetary gear engaged with the first sun gear, a second planetary gear engaged with the first planetary gear, a third planetary gear engaged with the second planetary gear, and a second sun gear concentric with the carrier, provided in parallel to the first sun gear, and engaged with the third planetary gear, wherein difference between the number of teeth of the first sun gear and the number of teeth of the second sun gear is at least one; the first, second, and third planetary gears are supported at different locations on one side of the carrier so as to be able to rotate and revolve and be disposed in n sets; the carrier is the input side; the second sun gear is a fixed side; the first sun gear is an output side; Z1 is defined as the number of teeth of the first sun gear; and Z2 is defined as the number of teeth of the second sun gear, and wherein when Z1>Z2 and (Z1−Z2)<Z2 are satisfied, an output of the first sun gear is deceleration in the same direction; when Z1<Z2 and (Z2−Z1)<Z1 are satisfied, the output of the first sun gear is deceleration in a reverse direction; and when the deceleration is in one of the same or reverse directions and the first sun gear is rotated by being changed to the input side, speed is not increased due to the self-locking function and a speed increase ratio is zero.

\* \* \* \* \*